US012712304B2

(12) United States Patent
Jiang

(10) Patent No.: US 12,712,304 B2
(45) Date of Patent: Aug. 18, 2026

(54) GROUND CONTACT CONNECTION MEMBER, CONNECTOR, AND CONNECTOR ASSEMBLY

(71) Applicant: Tyco Electronics Japan G.K., Kawasaki (JP)

(72) Inventor: Ming Jiang, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 341 days.

(21) Appl. No.: 18/530,906

(22) Filed: Dec. 6, 2023

(65) Prior Publication Data

US 2024/0186736 A1 Jun. 6, 2024

(30) Foreign Application Priority Data

Dec. 6, 2022 (JP) ................................ 2022-194864

(51) Int. Cl.
*H01R 13/424* (2006.01)
*H01R 12/91* (2011.01)
*H01R 13/11* (2006.01)

(52) U.S. Cl.
CPC ........... *H01R 13/112* (2013.01); *H01R 12/91* (2013.01); *H01R 13/424* (2013.01)

(58) Field of Classification Search
None
See application file for complete search history.

(56) References Cited

U.S. PATENT DOCUMENTS 6,659,791 B1 * 12/2003 Ko ..................... H01R 13/6275 439/353
7,320,623 B2 * 1/2008 Hisamatsu ........... H01R 12/721 439/108
7,722,403 B2 5/2010 Neumetzler
8,764,488 B2 * 7/2014 Zeng .................. H01R 13/6585 439/108
8,858,243 B2 * 10/2014 Luo ........................ H01R 31/08 439/607.05
9,583,882 B1 * 2/2017 Hsueh .................. H01R 12/724
10,938,162 B2 * 3/2021 Lin .................... H01R 13/6471
11,121,506 B2 * 9/2021 Feng .................. H01R 13/6585
11,495,917 B2 * 11/2022 Buck .................... H01R 43/205
2008/0220650 A1 9/2008 Wu
2019/0393634 A1 * 12/2019 Kao .................. H01R 13/6471
2023/0318226 A1 10/2023 Xu et al.

FOREIGN PATENT DOCUMENTS

CN 113346285 A 9/2021
EP 1495522 B1 * 5/2008 ........... H01R 9/2483
WO WO-2022166321 A1 * 8/2022 ........... H01R 12/724

OTHER PUBLICATIONS

Extended European Search Report, Application No. 23214557.3-1201, dated May 2, 2024, 10 pages.

* cited by examiner

*Primary Examiner* — Tho D Ta

(57) ABSTRACT

A ground contact connecting member comprises a support portion and a plurality of contacting beams. The support portion extends in a first direction and is adapted to be fixed to an installation portion of a connector housing. The plurality of contacting beams extend from the support portion in a second direction, perpendicular to the first direction. The contacting beams are adapted to contact a plurality of ground contacts arranged in the connector housing in a third direction perpendicular to the first direction and the second direction.

20 Claims, 19 Drawing Sheets

GROUND CONTACT CONNECTION MEMBER, CONNECTOR, AND CONNECTOR ASSEMBLY

CROSS-REFERENCE TO RELATED APPLICATION

This application claims the benefit of Japanese Patent Application No. 2022-194864 filed on Dec. 6, 2022, the whole disclosure of which is incorporated herein by reference.

FIELD OF THE INVENTION

The present invention relates to means or element for making a contact group equipotential, a connector including the means, and a connector assembly including the connector.

BACKGROUND

A so-called floating connector assembly can be used for a mechanical connection and an electrical connection between components included in various electronics. Such a connector assembly includes a first connector including a contact joined to a first circuit board, and a second connector including a contact joined to a second circuit board. In order to avoid aid in assembling the first connector and the second connector with the first circuit board and the second circuit board due to dimensional and form, machining, and/or assembly tolerances, the first connector and the second connector are configured to be mateable even when they are misaligned relative to each other within a predetermined floating range. This may include allowing elastic deformation of the contacts, which are formed in a predetermined shape.

A socket connector according to the prior art further includes a lower shell, an upper shell inserted into the lower shell from above, and a plurality of socket contacts retained by the lower shell and the upper shell and is mated with a plug connector. Each socket contact is formed in a shape having a plurality of bends and is retained by the lower shell and the upper shell. The upper shell is assembled with the lower shell by engagement with a metal fitting. The metal fitting is joined to the circuit board in order to reinforce joint between the socket contacts and the circuit board. The socket connector of the prior art further includes an electrical conductor in contact with some of the plurality of contacts. This electrical conductor makes the contacts in contact therewith equipotential. The electrical conductor is an elongated member having a rectangular cross-sectional shape and has a plurality of protrusions formed at equal intervals on opposite side faces. When this electrical conductor is accommodated in a lower end portion of the upper shell, the protrusions are exposed through grooves formed in the upper shell and brought into contact with the respective contacts.

The connector(s) of the prior art require strict management of dimensional and shape, machining, and assembly tolerances in order to ensure that the electrical conductor having the plurality of protrusions formed thereon is assembled with the upper shell and that the protrusions exposed through the grooves of the upper shell are in contact with the contacts. However, with increased structural complexity of electronics, and with increased contact pitch fineness, the tolerance management becomes more difficult. As a result, it is difficult to bring the plurality of protrusions of the electrical conductor into stable contact with the respective contacts.

SUMMARY

According to an embodiment of the present disclosure, a ground contact connecting member comprises a support portion and a plurality of contact beams. The support portion extends in a first direction and is adapted to be fixed to an installation portion of a connector housing. The plurality of contacting beams extend from the support portion in a second direction, perpendicular to the first direction. The contacting beams are adapted to contact a plurality of ground contacts arranged in the connector housing in a third direction perpendicular to the first direction and the second direction.

BRIEF DESCRIPTION OF THE DRAWINGS

The invention will now be described by way of example with reference to the accompanying Figures, of which:

FIG. 1(*b*) is a cross sectional view along a line Ib-Ib of FIG. 1(*a*).

FIG. 2(*b*) is a cross sectional view along a line IIb-IIb of FIG. 2(*a*).

FIG. 6(*b*) is a partial enlarged front view of a guide protrusion. FIG. 6(*c*) is a partial enlarged side view of the guide protrusion.

FIG. 9(*b*) is an isometric view of the first contact, and FIG. 9(*c*) is a front view of the first contact.

FIG. 10(*b*) is a front view of the ground contact connecting member shown from a direction of an arrow Xb of (a).

FIG. 12(*b*) is an isometric view showing the ground contact connecting member including contacting portions so arranged as to correspond to the positions of ground-use contacts of FIG. 12(*a*).

FIG. 13(*b*) is an isometric view showing the ground contact connecting member including contacting portions so arranged as to correspond to the positions of ground-use contacts of FIG. 13(*a*).

FIG. 15(*b*) is a transverse cross sectional view of FIG. 15(*a*).

DETAILED DESCRIPTION OF THE EMBODIMENTS

Figure 1A:
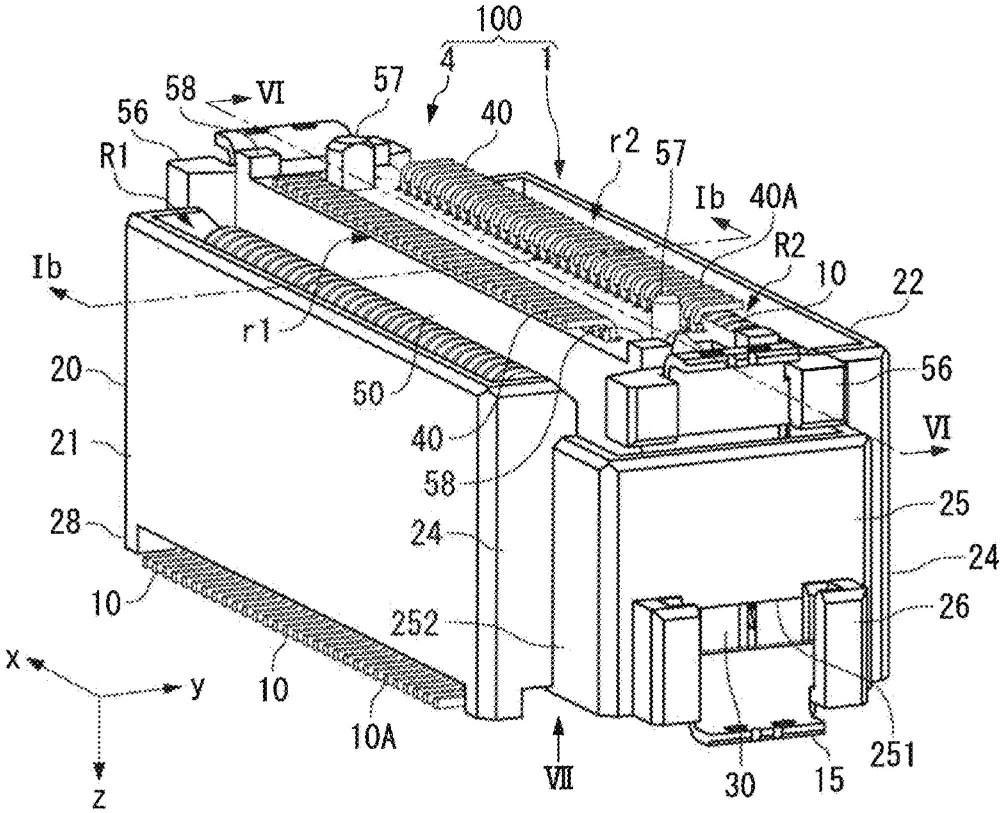
FIG. 1(*a*) is an isometric view showing a connector assembly according to an embodiment of the present embodiment. The connector assembly includes a first connector and a second connector.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
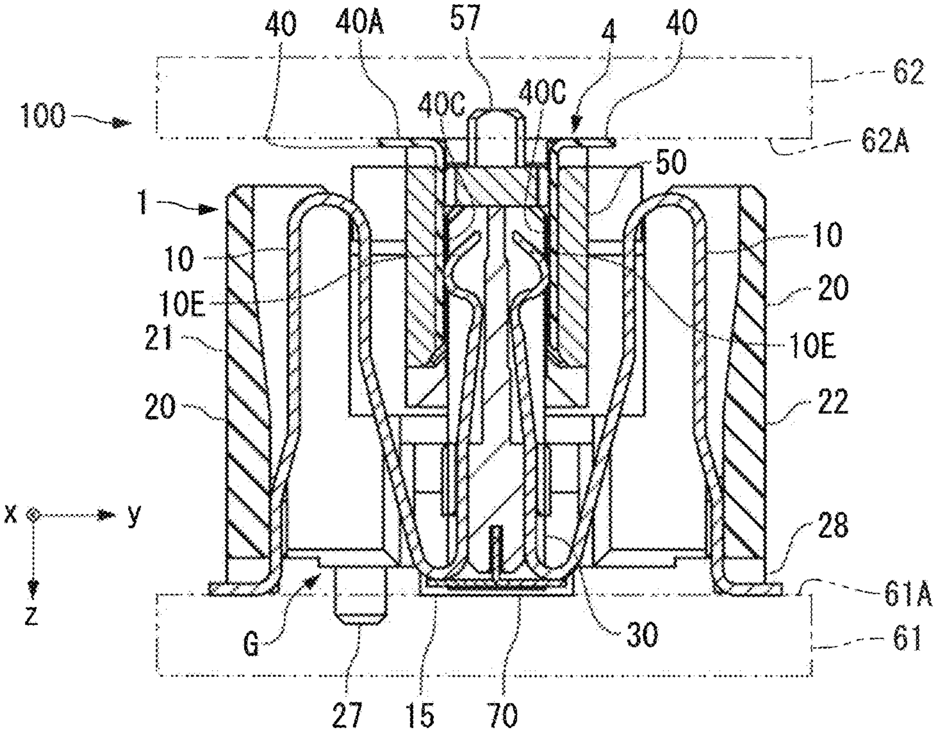

A connector assembly 100 shown in FIGS. 1(*a*) and 1(*b*) includes a first connector 1 and a second connector 4 that are mated with each other and is used for a mechanical connection and an electrical connection between circuit boards included in various electronics. General configurations of the first connector 1 and the second connector 4 will be first described.

The first connector 1 includes a plurality of first contacts 10, and a stationary housing 20 and a movable housing 30 that retain the plurality of first contacts 10. The plurality of first contacts 10 are joined to a first circuit board 61 as an object to be joined. The first contacts 10 are arranged in a first row R1 and in a second row R2 in parallel along a predetermined first direction x and arranged on a first mounting face 61A of the first circuit board 61.

The second connector 4 includes a plurality of second contacts 40, and a housing 50 retaining the plurality of second contacts 40. The plurality of second contacts 40 are joined to a second circuit board 62. Like the first contacts 10, the second contacts 40 are also arranged in a first row r1 and in a second row r2 in parallel and arranged on a second mounting face 62A of the second circuit board 62. When the first connector 1 and the second connector are mated, the first contacts 10 of the first row R1 are individually electrically connected to the second contacts 40 of the first row r1, and the first contacts 10 of the second row R2 are also individually electrically connected to the second contacts 40 of the second row r2.

The first connector 1 and the second connector 4 are mated in a mating direction z perpendicular to the first mounting face 61A and to the second mounting face 62A, with the first circuit board 61 and the second circuit board 62 arranged in parallel with each other. The first mounting face 61A includes the first direction x and a second direction y perpendicular to the first direction x and to the mating direction z. The same applies to the second mounting face 62A. A side toward the first circuit board 61 in the mating direction z (a third direction) is referred to herein as a lower side, and a side opposite to the first circuit board 61 in the mating direction z as an upper side. The first connector 1 of the present embodiment, as will be described below, allows relative displacement between the first circuit board 61 and the second circuit board 62 within floating ranges corresponding to dimensions of gaps set in the first direction x and the second direction y, respectively, between the stationary housing 20 and the movable housing 30.

Figure 2A:
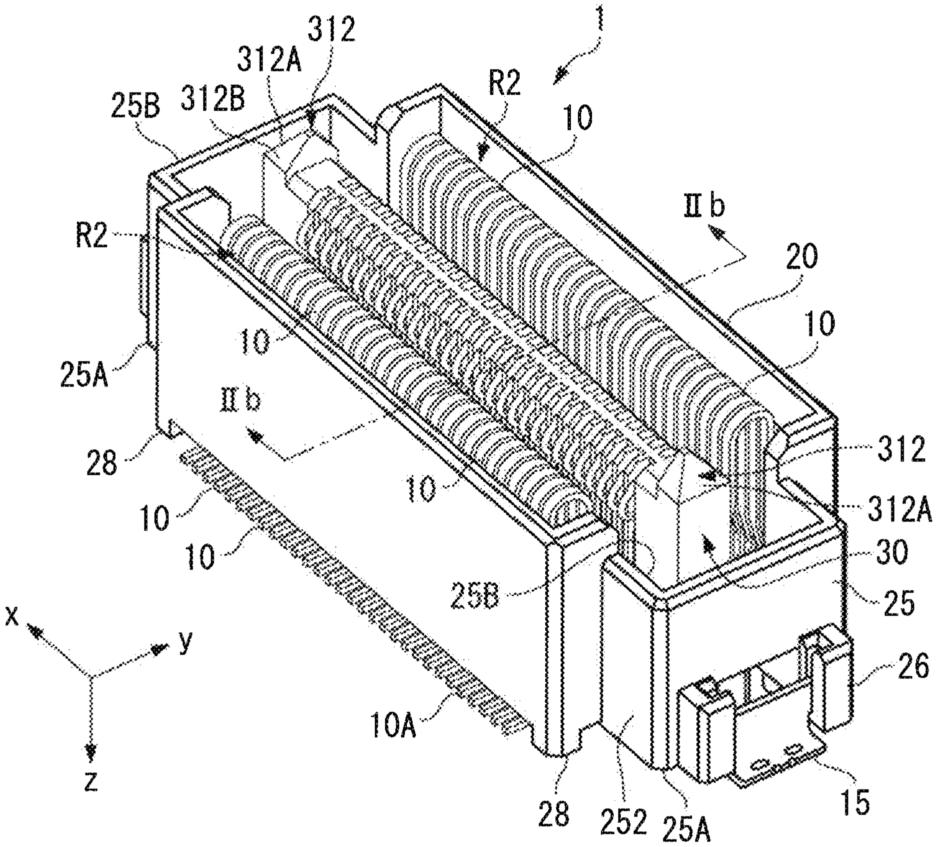
FIG. 2(*a*) is an isometric view showing the first connector.
Figure 2B:
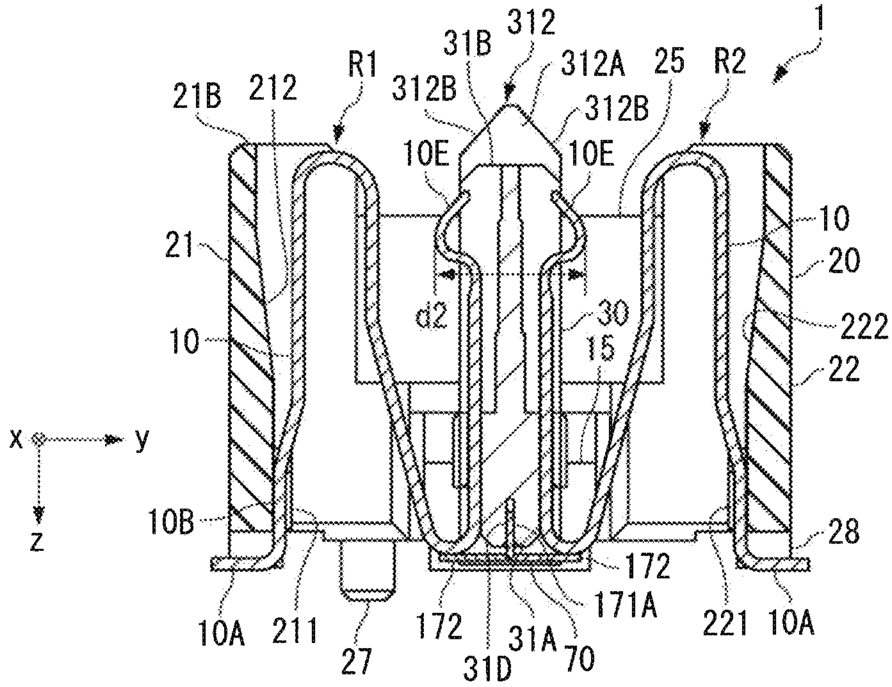

As shown in FIGS. 2(*a*), 2(*b*), and 3, the first connector 1 includes the plurality of first contacts 10, the stationary housing 20, and the movable housing 30 so arranged as to be displaceable relative to the stationary housing 20. In addition, it is preferred that the first connector 1 include housing joining members 15 joining the stationary housing 20 to the first circuit board 61, and a ground contact connecting member 70 (FIG. 4) contacting some of the contacts 10. It should be noted that the ground contact connecting member 70 is not shown in some of the drawings.

The first contacts 10 of the first row R1 and the first contacts 10 of the second row R2 are each arranged with an equal pitch in the first direction x, and are arranged adjacently in the second direction y. In the present embodiment, the first contacts 10 of the first row R1 and the first contacts 10 of the second row R2 are so arranged as to have their positions in the first direction x coincident with each other. The first contacts 10 of the first row R1 and the first contacts 10 of the second row R2 are not limited to this and may be so arranged as to be shifted in the first direction x by half the pitch from each other. The stationary housing 20 is integrally formed by injection molding using an electrically insulating resin material. The same applies to the movable housing 30.

Figure 5:
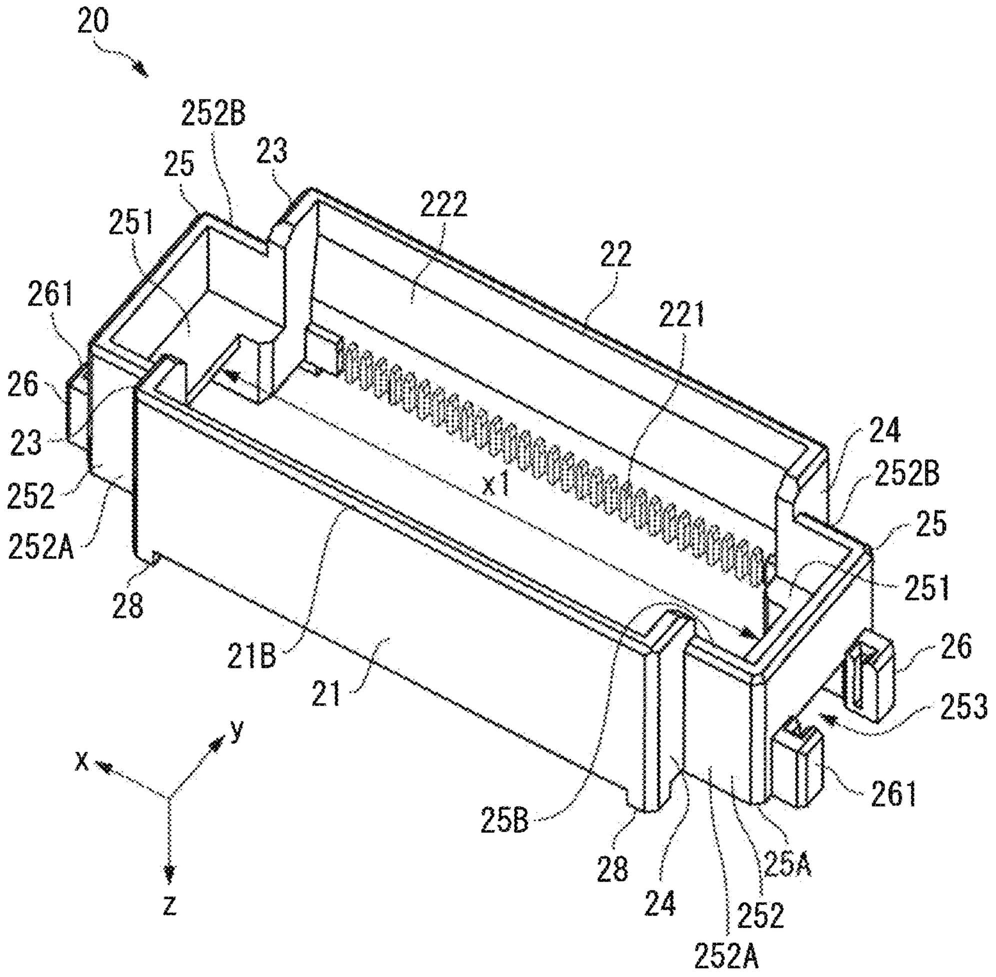
FIG. 5 is an isometric view showing a stationary housing of the first connector.

The stationary housing 20, as shown in FIG. 5, includes side walls 21, 22 and partial walls 23, 24 enclosing the plurality of first contacts 10 and arranged on the first mounting face 61A, extended walls 25 so formed on opposite sides of the stationary housing 20 in the first direction x as to protrude outward in the first direction x from the partial walls 23, 24, joining member retaining portions 26 retaining the housing joining members 15, positioning bosses 27 inserted into holes, not shown, formed in the first circuit board, and legs 28 arranged on the first mounting face 61A. It should be noted that the bosses 27 are not shown in some of the drawings.

The side walls 21, 22 extend in the first direction x in which the first contacts 10 are arranged, and face each other in the second direction y. The partial walls 23, 24 perpendicular to the side walls 21, 22 are arranged on opposite sides in the second direction y between the side walls 21, 22, and are continuous with the extended walls 25. A space which has a rectangular shape as seen in a plan view and in which the first contacts 10 are arranged is formed inside the walls 21 to 24. The legs 28 are formed at lower ends of four corners between the walls 21 to 24. The side walls 21, 22 and the partial walls 23, 24 rise relative to the mounting face 61A from their respective lower ends (for example, 21A) to their respective upper ends (for example, 21B) slightly above the first contacts 10. Gaps G (FIG. 1(*b*)) are formed between the lower ends of the walls 21 to 24 and the first mounting face 61A.

Retaining grooves 211 into which the first contacts 10 of the first row R1 are press-fitted are formed with the same pitch as the first contacts 10 near the lower end inside the side wall 21. Likewise, retaining grooves 221 into which the first contacts 10 of the second row R2 are press-fitted are formed with the same pitch as the first contacts 10 near the lower end inside the side wall 22. A chamfered portion 212 is formed above the retaining grooves 211 inside the side wall 21 in order to avoid interference between the first contacts 10 and the stationary housing 20. The chamfered portion 212 is formed from a position above the retaining grooves 221 to a position near the upper end 21B of the side wall 21. The chamfered portion 212 is so inclined relative to the mating direction z as to become farther from a first section 101 of the first contact 10 in the second direction y as it approaches a first curved portion C1 from a stationary retaining portion 10B. A chamfered portion 222 similar to the chamfered portion 212 is formed inside the side wall 22.

The extended wall 25 is formed in a rectangular shape as seen in a plan view by a wall rising in the mating direction z from a lower end 25A to an upper end 25B. The upper end 25B is lower than the upper end 21B of the side wall 21 and an upper end 31B of the movable housing 30. The extended walls 25, on the opposite sides of the stationary housing 20 in the first direction x, contribute to assembling the stationary housing 20 and the movable housing together while receiving respective portions of the movable housing 30 and the second connector 4 therein. In addition, the extended wall 25 sets gaps between the stationary housing 20 and the movable housing 30, thereby setting floating ranges. It is preferred that the extended walls 25 be symmetrically formed in the first direction x with the walls 21 to 24 therebetween.

Figure 7:
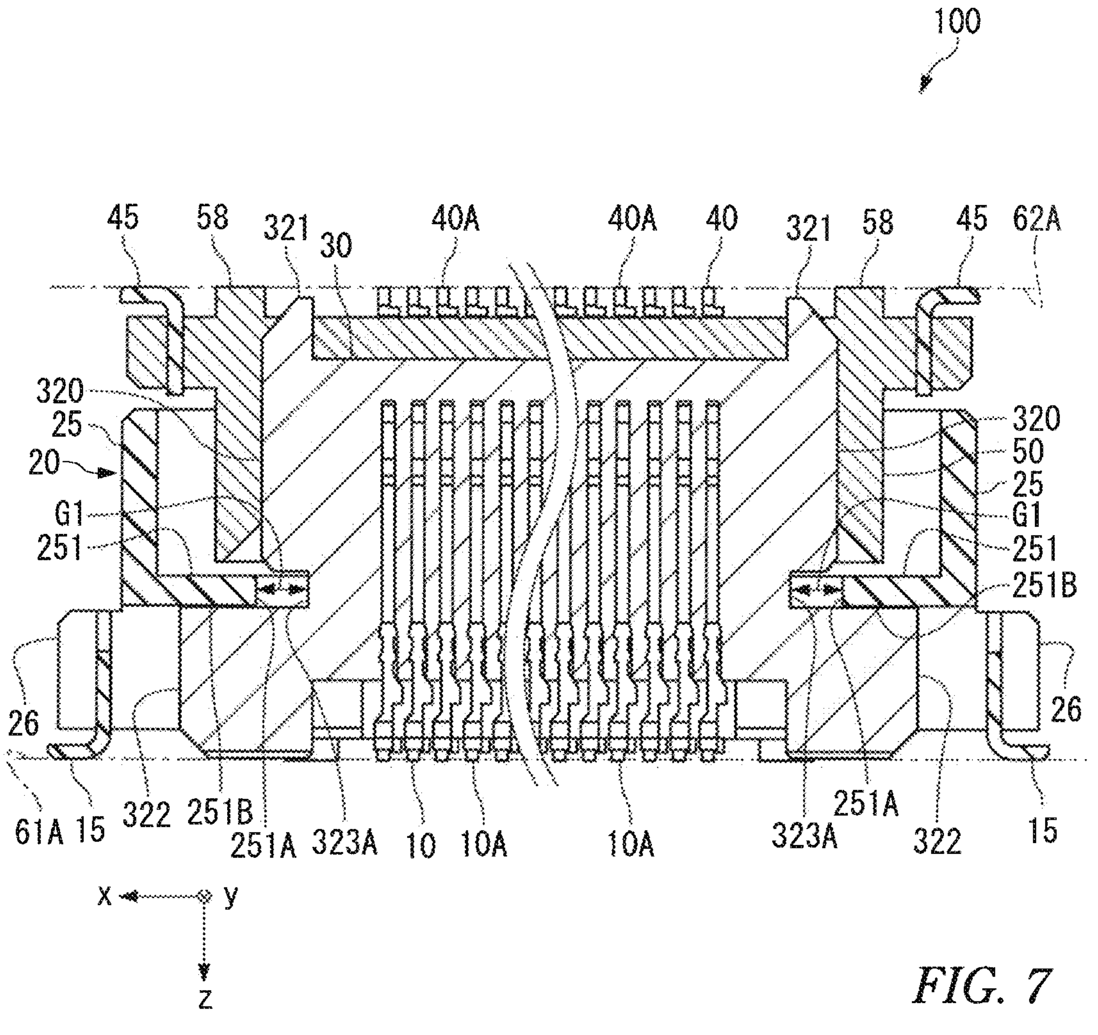
FIG. 7 is a cross sectional view along a line VII-VII of FIG. 1(*a*), the view showing a first gap set between the stationary housing and the movable housing in a first direction.
Figure 8:
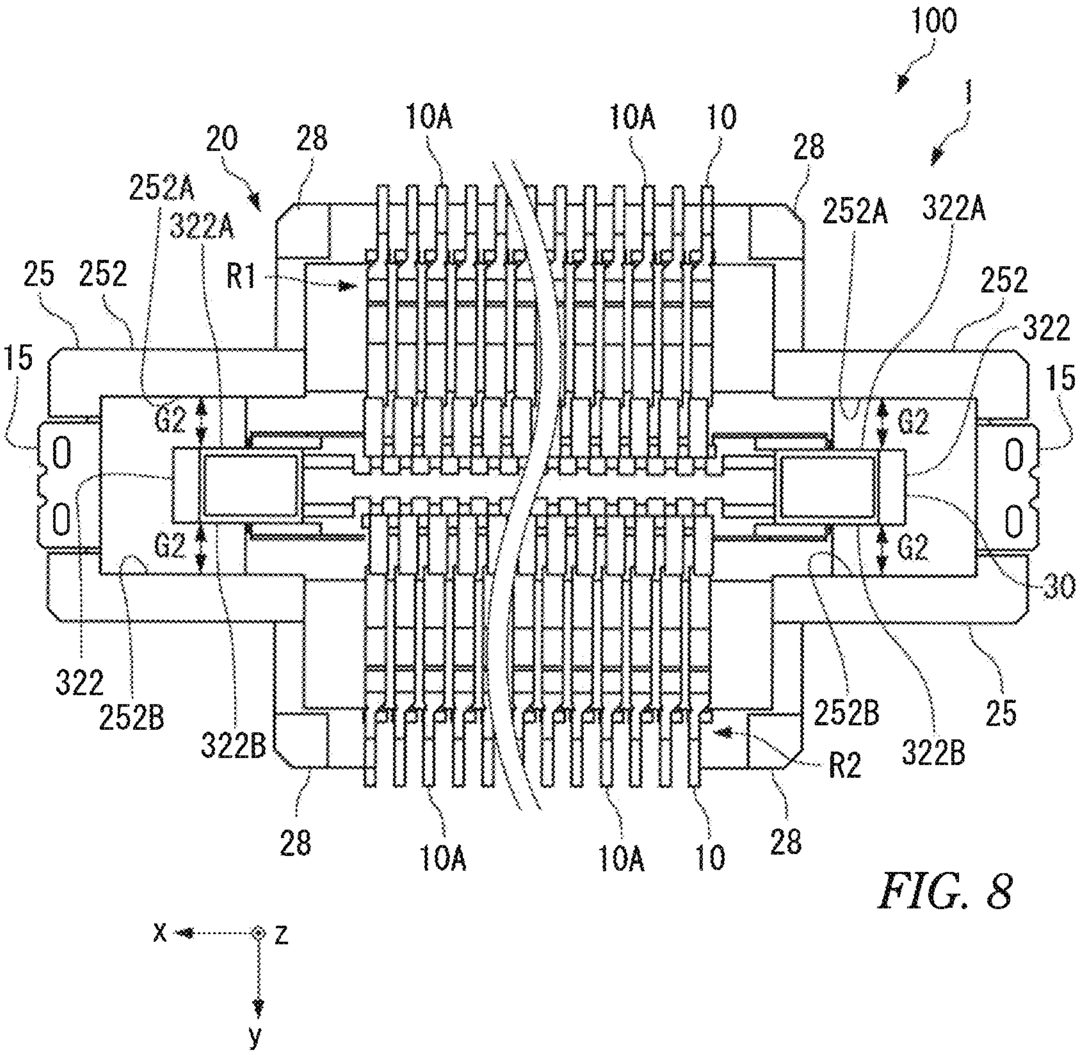
FIG. 8 is a bottom view shown from a direction of an arrow VIII of FIG. 1(*a*), the view showing a second gap set between the stationary housing and the movable housing in a second direction. The ground contact connecting member is not shown.

As shown in FIGS. 7 and 8, a facing portion 251 so arranged as to face the first mounting face 61A is formed on the extended wall 25 inside the stationary housing 20. The facing portion 251 sets a first gap G1 in the first direction x between the stationary housing 20 and the movable housing 30. The facing portion 251 is formed in a plate-like shape extending in the first direction x and in the second direction y and is supported by the wall of the extended wall 25. The facing portion 251 of the present embodiment is so formed as to be substantially C-shaped as seen in a plan view, as will be understood from FIG. 5. A predetermined dimension x1 is given between the facing portion 251 at one end in the first direction x and the facing portion 251 at the other end.

Figure 3:
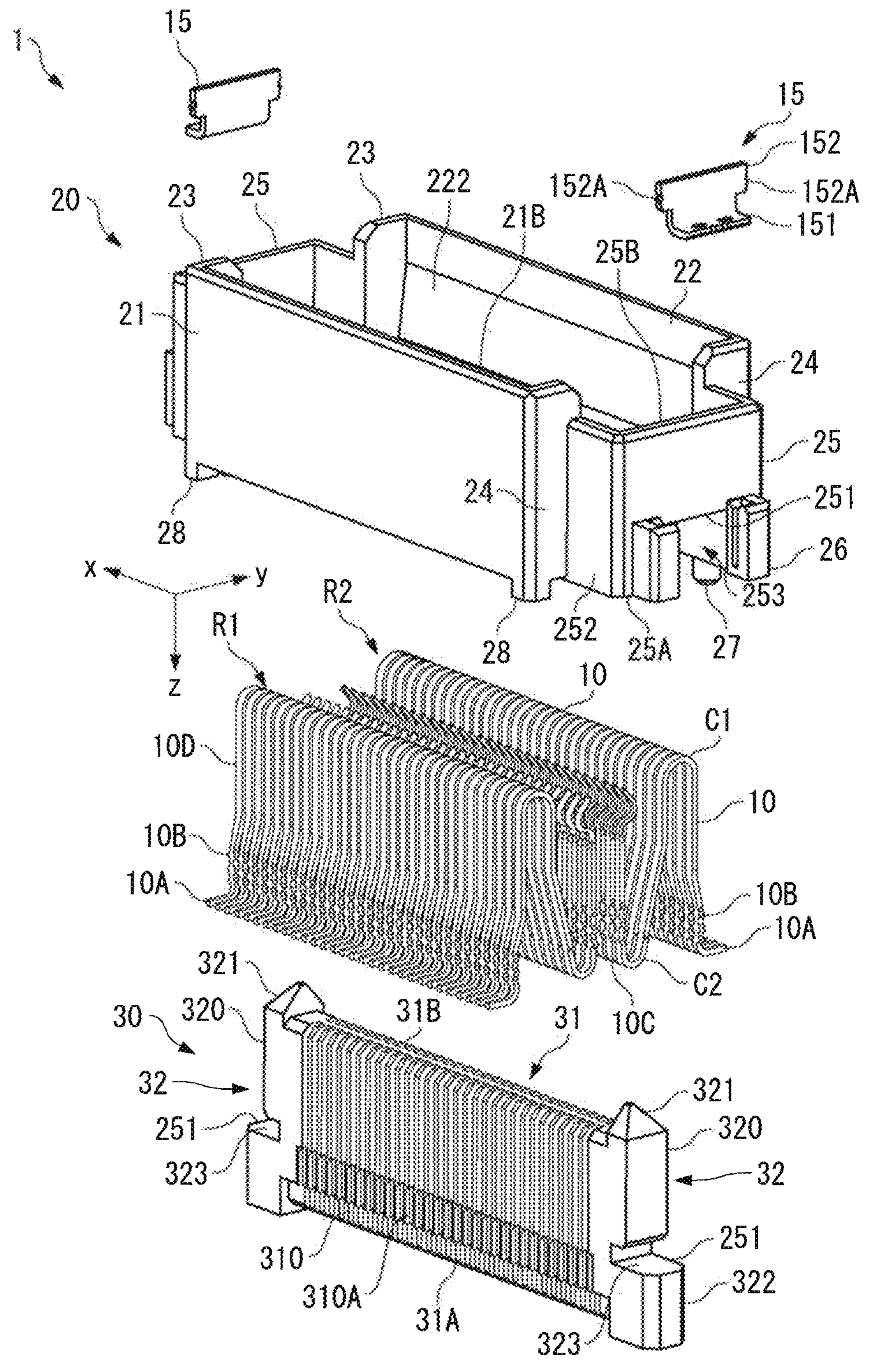
FIG. 3 is an exploded isometric view of the first connector (excluding a ground contact connecting member).

The housing 50 of the second connector 4 is arranged above the facing portions 251 inside the extended walls 25. A side below the facing portion 251 of the extended wall 25 is equivalent to a lower region 252 (FIG. 5) in which a second gap G2 in the second direction y is set between the stationary housing 20 and the movable housing 30. The lower region 252 includes side walls 252A, 252B extending in the first direction x and in the mating direction z below the facing portion 251. The joining member retaining portions 26 are provided at the extended walls 25 on the opposite sides of the stationary housing 20 in the first direction x and retain the housing joining members 15 shown in FIG. 3. The housing joining member 15 includes a joining portion 151 joined with solder, not shown, to the first circuit board 61, and a press-fit portion 152 having protrusions 152A on opposite sides. A pair of grooves 261 retaining the housing joining member 15 press-fitted from above are formed in the joining member retaining portion 26 along the mating direction z. An opening 253 is formed in the extended wall 25 below the facing portion 251 and between the pair of grooves 261. It should be noted that the opening 253 may not be formed in the extended wall 25.

The stationary housing 20, as shown in FIGS. 2(*b*) and 3, includes the two pin-like bosses 27. The two bosses 27 protrude in the mating direction z from the lower ends of the side walls 21, 22 or of the partial walls 23, 24, and are spaced from each other in both the first direction x and the second direction y. These bosses 27 have different diameters. Therefore, the first connector 1 can be attached to the first circuit board 61 in a correct orientation that enables the two bosses 27 to be inserted into the holes of the first circuit board 61.

The movable housing 30, as shown in FIGS. 2(*a*), 2(*b*) and 6(*a*), divides the inside of the stationary housing 20 into the first row R1 side and the second row R2 side, and retains the first contacts 10 of the first row R1 and the contacts 10 of the second row R2 with the stationary housing 20. The movable housing 30 includes a retaining region 31 extending in the first direction x with a length commensurate with the lengths of the rows R1, R2, and retaining the first contacts 10, and extended regions 32 continuous with opposite sides of the retaining region 31 in the first direction x and involved in positioning relative to the second connector 4, assembling with the stationary housing 20, and setting of the floating ranges. The retaining region 31 is given a width (a dimension in the second direction y) and a height (a dimension in the mating direction z) required for retaining the first contacts 10 of the first row R1 and the first contacts 10 of the second row R2. A plurality of grooves 310 in each of which the first contact 10 is arranged are formed along the mating direction z in a side face 311 on the first row R1 side of the retaining region 31 and in a side face 312 on the second row R2 side.

Guide slopes 31C for positioning the movable housing 30 relative to the second contacts 40 of the second connector 4 in the second direction y are formed on the first row R1 side and the second row R2 side in an upper end 31B of the retaining region 31. The groove 310 includes a retaining groove 310A into which the first contact 10 is press-fitted, and the groove 310 as a whole is continuous across entire heights of the sides faces 311, 312. The grooves 310 are arranged in the first direction x with a constant pitch. The depth (a dimension in the second direction y) of the groove 310, as shown in FIG. 2(*b*), varies in the mating direction z.

The retaining grooves 310A are formed in the vicinity of a lower end 33 of the retaining region 31. The lower end 33 faces the first mounting face 61A.

A ground retaining groove 31D (FIG. 2(*b*)) into which the ground contact connecting member 70 is press-fitted is formed in the lower end 33 of the retaining region 31. A plurality of the ground retaining grooves 31D, which are recessed upward from the lower end 33, are scattered in the first direction x in the retaining region 32. The extended region 32 includes an upper portion 320 formed with a guide protrusion 321 arranged above the upper ends 31B of the side faces 311, 312, and a lower portion 322 arranged below the facing portion 251 of the stationary housing 20. It is preferred that the extended regions 32 be symmetrically formed in the first direction x with the retaining region 31 therebetween.

A recess 323 recessed in the first direction x in a position corresponding to the facing portion 251 is formed in the extended region 32. The upper portion 320 and the lower portion 322 are divided by the recess 323. An inner dimension in the mating direction z of the recess 323 is equal to or larger than the thickness of the facing portion 251. Depending on relative positions of the movable housing 30 and the stationary housing 20, the facing portion 251 is inserted into the recess 323. The facing portion 251 can be received in the recess 323 until an end face 251A of the facing portion 251 abuts against a back face 323A of the recess 323.

The guide protrusions 321 come into contact with the housing 50 before the guide slopes 31C come into contact with the housing 50 or the second contacts 40 of the second connector 4, and follow the position of the housing 50 to guide the movable housing 30 in the first direction x and in the second direction y. To this end, a slope 321A inclined relative to a y-z plane and slopes 321B inclined relative to an x-z plane are formed on the guide protrusion 321.

Figure 6A:
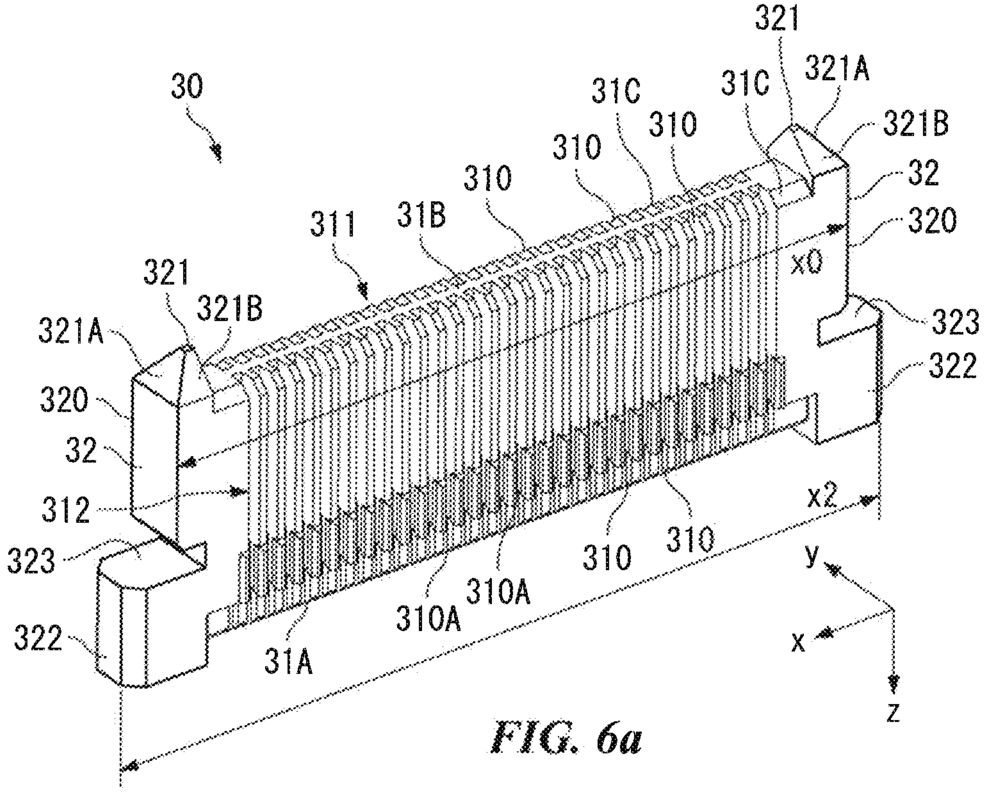
FIG. 6(*a*) is an isometric view showing a movable housing of the first connector.
Figure 6B:
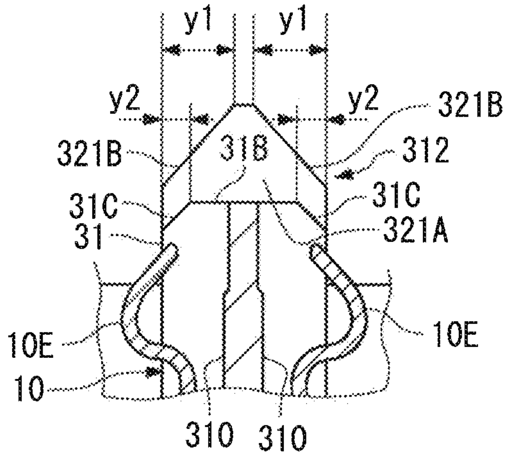
Figure 6C:
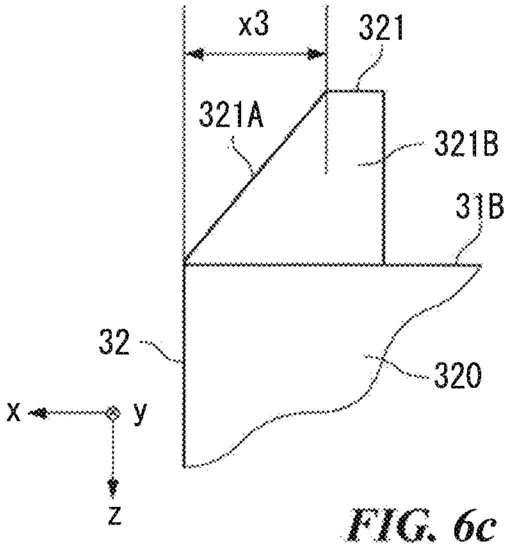

As shown in FIG. 6(*b*), for the slope 321B of the guide protrusion 321, a guide range y1 is set within which the movable housing 30 is displaceable in the second direction y under guidance by the slope 321B. The guide range y1 is wider than a guide range y2 within which the movable housing 30 is displaceable in the second direction y under guidance by the guide slope 31C. In addition, as shown in FIG. 6(*c*), for the slope 321A of the guide protrusion 321, a guide range x3 is set within which the movable housing 30 is displaceable in the first direction x under guidance by the slope 321A.

A dimension x0 (FIG. 6(*a*)) in the first direction x of the upper portion 320 is smaller than the dimension x1 (FIG. 5) between the facing portions 251 on the opposite sides. On the other hand, a dimension x2 (FIG. 6(*a*)) in the first direction x of the lower portion 322 is larger than the dimension x1 (FIG. 5) between the facing portions 251 on the opposite sides.

Therefore, as shown in FIG. 7, the movable housing 30 can be inserted into the stationary housing 20 from below until the lower portions 322 are abutted against lower faces 251B of the facing portions 251. The upper portions 320 at this time are accommodated into the stationary housing 20 to a position above the facing portions 251. The upper portions 320 are mated with the housing 50 of the second connector 4. The housing 50, inside the stationary housing 20, is so arranged as to enclose the upper portions 320.

When the stationary housing 20 is fixed to the first circuit board 61 by joining the first contacts 10 and the housing joining members 15 to the first circuit board 61, the lower portions 322 are arranged between the facing portions 251 and the first mounting face 61A of the first circuit board 61. Since the lower portions 322 are held between the facing portions 251 and the first circuit board 61 in the mating direction z, the movable housing 30 is so assembled with the stationary housing 20 and the first circuit board 61 as not to be disengaged upward or downward. Therefore, the first connector 1 is not required to include a metal fastener or the like for assembling the movable housing 30, the stationary housing 20, and the first circuit board 61 together, and the movable housing 30 and the stationary housing 20 are not restrained by such a metal fastener or the like.

As shown in FIG. 7, on each side of the first connector 1 in the first direction x, the first gap G1 having a predetermined dimension is set between the end face 251A of the facing portion 251 and the back face 323A of the recess 323. FIG. 7 shows the stationary housing 20 and the movable housing 30 having their respective centers in the first direction x coincidence with each other. From this state, a relative displacement in the first direction x of the movable housing 30 to the right side or the left side of FIG. 7 relative to the stationary housing 20 is allowed by up to the dimension of the first gap G1. For example, if the first gap G1 is 1 mm, the first connector 1 is given a floating range of ±1 mm in the first direction x.

In addition, as shown in FIG. 8, the second gaps G2 are each set between the side wall 322A of the lower portion 322 and an inner face of the side wall 252A of the lower region 252, and between the side wall 322B of the lower portion 322 and an inner face of the side wall 252B of the lower region 252. FIG. 8 shows the stationary housing 20 and the movable housing 30 having their respective centers in the second direction y coincidence with each other. From this state, a relative displacement in the second direction y of the movable housing 30 to the upper side or the lower side of FIG. 8 relative to the stationary housing 20 is allowed by up to the dimension of the second gap G2. For example, if the second gap G2 is 1 mm, the first connector 1 is given a floating range of ±1 mm in the second direction y.

Since the movable housing 30 and the stationary housing 20 are capable of relative displacement in the first direction x and in the second direction y, the movable housing 30 also has a positional degree of freedom in a direction of rotation in an x-y plane relative to the stationary housing 20. The first connector 1 is given a floating range of a predetermined angle in the direction of rotation in the x-y plane. Since the movable housing 30 and the stationary housing 20 are not restrained, the floating ranges commensurate with the sufficiently large gaps G1, G2 can be achieved within the limit of a maximum amount of elastic deformation of the first contact 10.

Figure 9A:
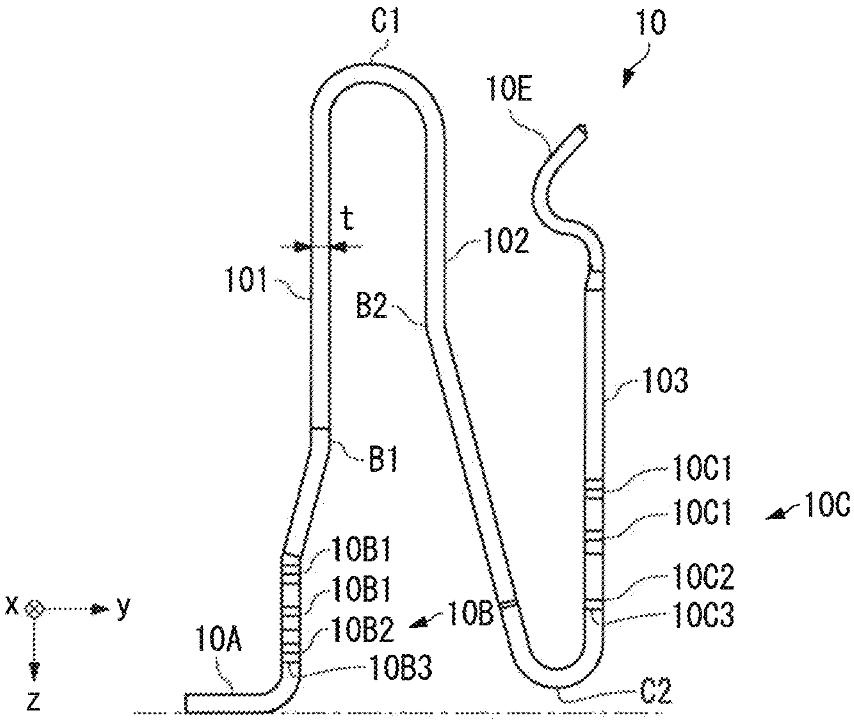
FIG. 9(*a*) is a side view of a first contact.
Figure 9B:
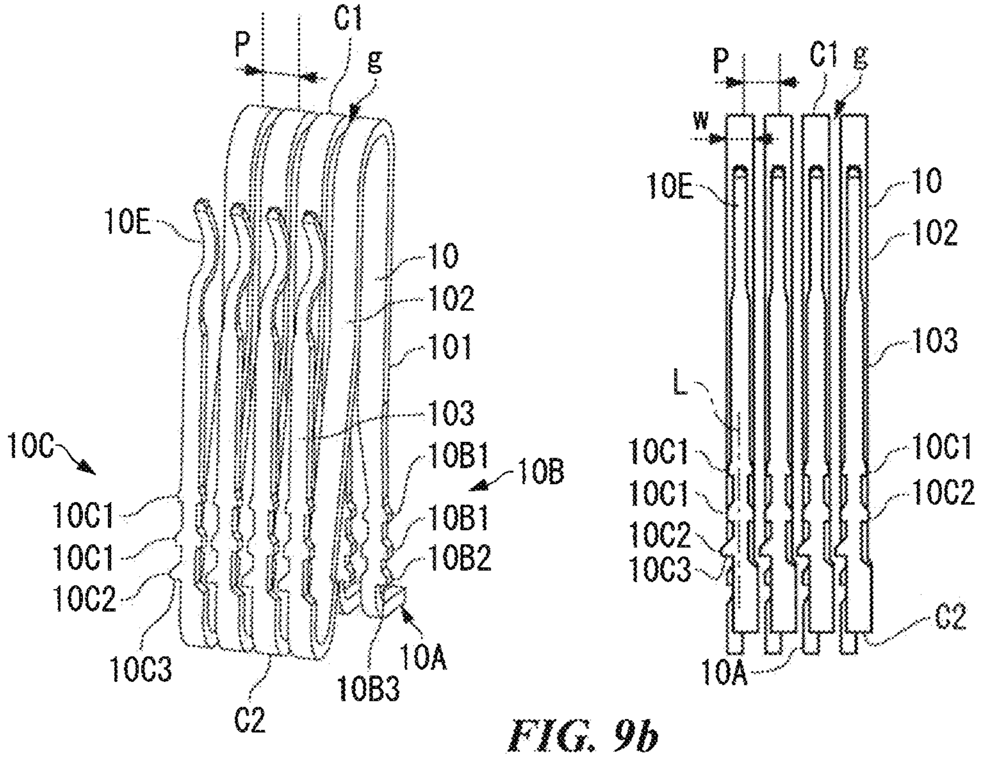

A configuration of the first contact 10 shown FIGS. 9(*a*) to 9(*c*), including its shape and functions of its portions, will be described. FIGS. 9(*a*) to 9(*c*) show the first contact 10 unloaded. The first contact 10 includes a joining portion 10A joined with solder to the first mounting face 61A, a stationary retaining portion 10B press-fitted into and retained by the stationary housing 20, a movable retaining portion 10C press-fitted into and retained by the movable housing 30, and a connecting portion 10E brought into contact with the second contact 40, and is given a curved shape that allows elastic deformation in the first direction x and in the second direction y. The joining portion 10A arranged in parallel with the first mounting face 61A and the stationary retaining portion 10B form an L-shape as seen in a side view.

The first curved portion C1 and a second curved portion C2 are formed between the stationary retaining portion 10B and the movable retaining portion 10C. The first curved portion C1, which is a top of the first contact 10, is inverted U-shaped as seen in the side view. The second curved portion C2 is substantially V-shaped as seen in the side view. A lower end of the second curved portion C2 is located above the joining portion 10A. The connecting portion 10E is substantially C-shaped as seen in the side view. An upper end of the connecting portion 10E is located below an upper end of the first curved portion C1. When it comes to its overall approximate shape, the first contact 10 is formed to be substantially N-shaped. The first contact 10 is formed by stamping a sheet material formed from a metal material such as a copper allow into a linear elongated shape, and further forming it.

All the floating ranges in the first direction x, in the second direction y, and in the direction of rotation in the x-y plane are set within an elastic range of the first contact 10.

Therefore, in order to increase the floating ranges, it is preferred that, among copper alloys, a material having a good spring property be used as a material of the first contact 10.

The first contact 10 is given a constant thickness across most of its length. A thickness t of the first contact 10 is determined to be, for example, within a range of 0.1 to 0.5 mm. The thickness of the connecting portion 10E is smaller than the thicknesses of the other portions.

In order to form the first contact 10 stably, a width w of the first contact 10 is determined to be at least equal to or more than the thickness t, for example, within a range of 0.1 to 0.5 mm. The width w of the first contact 10 varies in a length direction of the first contact 10.

For example, in an entire length of the first contact 10 from the joining portion 10A to the connecting portion 10E, the widths of the joining portion 10A and the connecting portion 10E are narrowest so that they will easily deflect in order to increase followability to the first mounting face 61A and the second contact 40.

A region of the first contact 10 above the movable retaining portion 10C is given a width narrower than the width of the movable retaining portion 10C. This region is smoothly inserted into the retaining groove 310A of the movable housing 30 from below. The first contacts 10 are arranged with a constant pitch P greater than a maximum width w set at the first curved portion C1 and at the second curved portion C2 and with a gap g between the adjacent first contacts 10. The pitch P is, for example, 0.3 to 0.5 mm, and the first contacts 10 are densely arranged. It is preferred that the gap g be 0.15 mm or more. All the first contacts 10 are arranged in parallel with the x-z plane. The first contacts 10 of the first row R1 and the first contacts 10 of the second row R2 are arranged with line symmetry with respect to an axis parallel with the mating direction z.

The first contact 10 includes the first section 101, a second section 102, and a third section 103. The first section 101 extends from the stationary retaining portion 10B to the first curved portion C1 toward the side opposite to the first mounting face 61A (the upper side). The second section 102 extends from the first curved portion C1, which is so curved as to project upward, toward the first mounting face 61A, and is continuous with the movable retaining portion 10C via the second curved portion C2. The third section 103 extends from the movable retaining portion 10C to the connecting portion 10E, which is connected to the second contact 40, toward the side opposite to the first mounting face 61A. A first bent portion B1 formed in a shape projecting toward the second section 102 is formed in the first section 101. A second bent portion B2 formed in a shape projecting toward the first section 101 is formed in the second section 102 in a position farther from the first mounting face 61A than the position of the first bent portion B1 in the mating direction z.

As shown in FIGS. 9(*b*) and 9(*c*), the stationary retaining portion 10B includes two press-fit protrusions 10B1 formed at two vertical stages on widthwise (equivalent to the first direction x) opposite sides, and a protrusion 10B2 formed on one widthwise side. A pressing portion 10B3 pressed by a jig, not shown, during press-fitting of the stationary retaining portion 10B is formed perpendicularly to a center line L on a rear side (a lower side) of the protrusion 10B2 in a press-fitting direction.

The movable retaining portion 10C includes press-fit protrusions 10C1, a positioning protrusion 10C2, and a pressing portion 10C3 which are similar to the press-fit protrusions 10B1, the protrusion 10B2, and the pressing portion 10B3 of the stationary retaining portion 10B. A protrusion dimension of the positioning protrusion 10C2 in the first direction x from the widthwise center line L of the first contact 10 is larger than a protrusion dimension of the press-fit protrusion 10C1 in the first direction x from the center line L.

With reference to FIG. 4 and FIGS. 10 to 14, the ground contact connecting member 70 will be described. Some of the first contacts 10 constituting the first row R1 correspond to a signal potential of an electronic circuit including the first circuit board 61 and the second circuit board 62, and the others correspond to a ground potential of the electronic circuit. Likewise, some of the first contacts 10 constituting the second row R2 correspond to the signal potential of the electronic circuit, and the others correspond to the ground potential of the electronic circuit.

Signal-use/ground-use allocation of the first contacts 10 is appropriately designed. The signal-use/ground-use allocation has various patterns according to products.

Figure 12A:
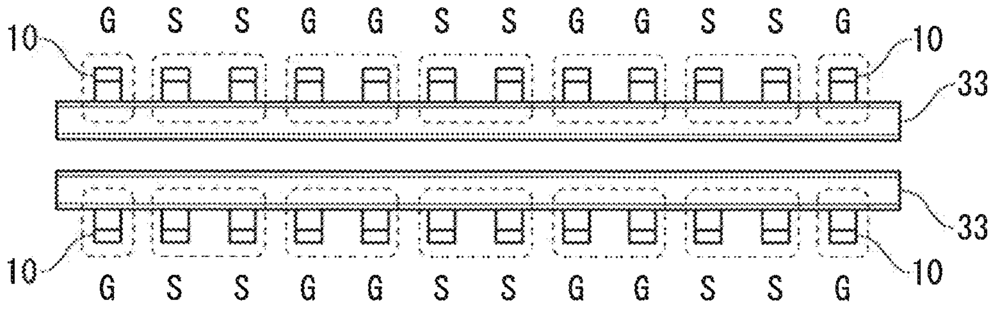
FIG. 12(*a*) is a schematic view showing an example of a signal-use/ground-use allocation pattern.
Figure 12B:
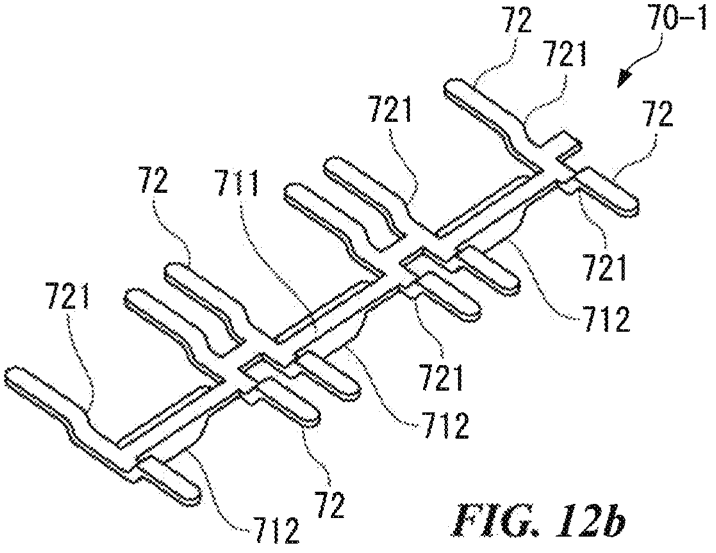
Figure 13A:
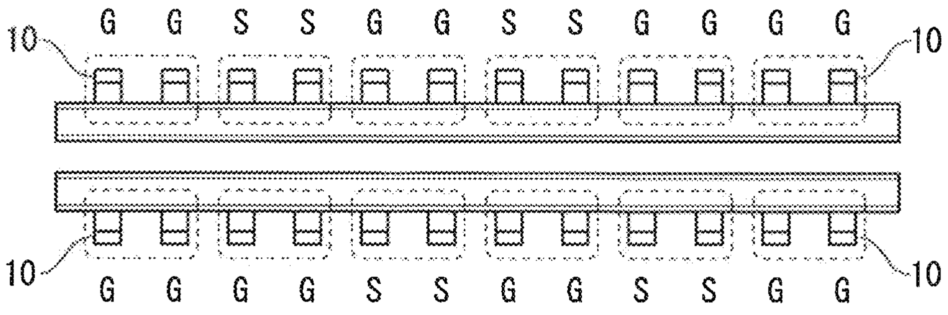
FIG. 13(*a*) is a schematic view showing an example of a signal-use/ground-use allocation pattern different from FIG. 12(*a*).
Figure 13B:
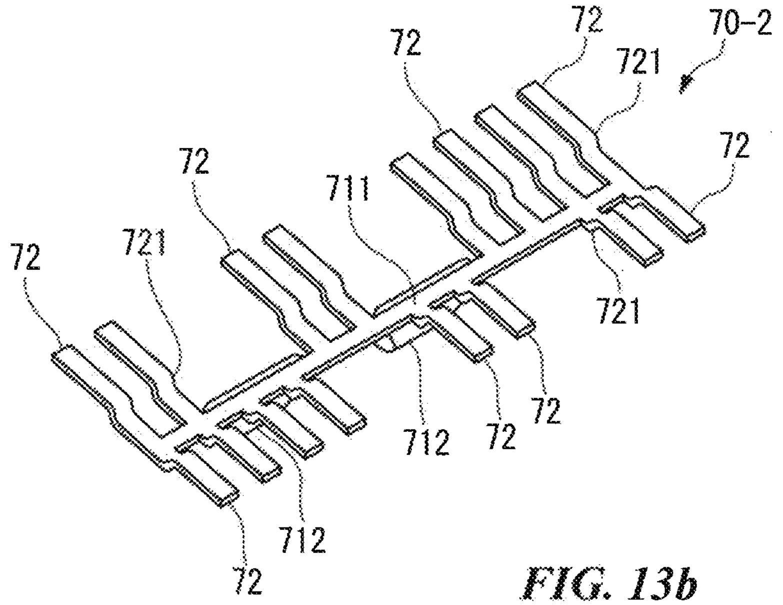
Figure 14:
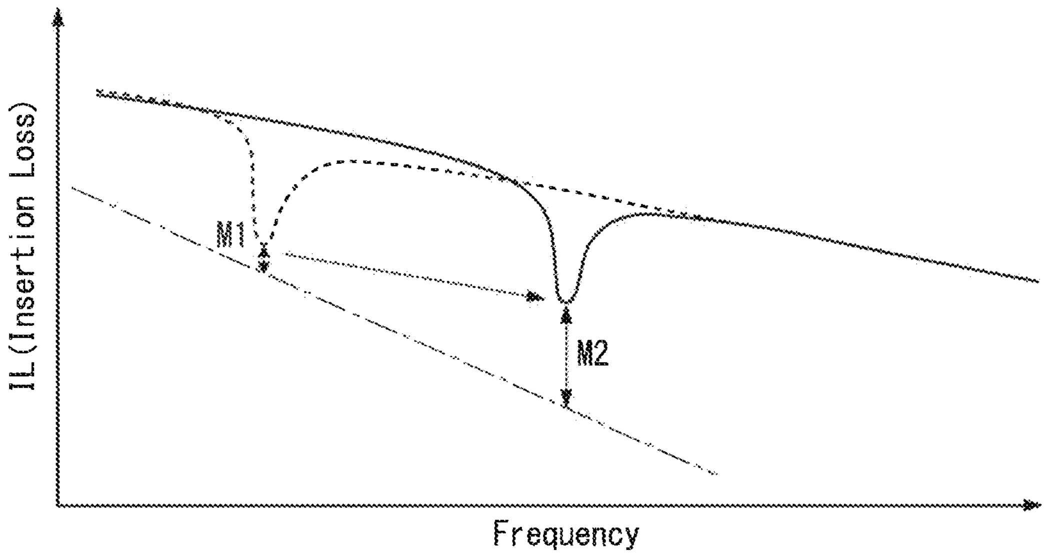
FIG. 14 is a graph for illustrating an advantage provided by the ground contact connecting member.

For example, FIG. 12(*a*) shows an example of the signal-use/ground-use allocation pattern. “S” indicates a signal-use contact, and “G” indicates a ground-use contact. FIG. 13(*a*) shows another example of the signal-use/ground-use allocation pattern. The arrangement of “S” and “G” of the first row R1 of FIG. 12(*a*) and the arrangement of “S” and “G” of the first row R1 of FIG. 13(*a*) are different. In addition, the arrangement of “S” and “G” of the second row R2 of FIG. 12(*a*) and the arrangement of “S” and “G” of the second row R2 of FIG. 13(*a*) are different.

Figure 4:
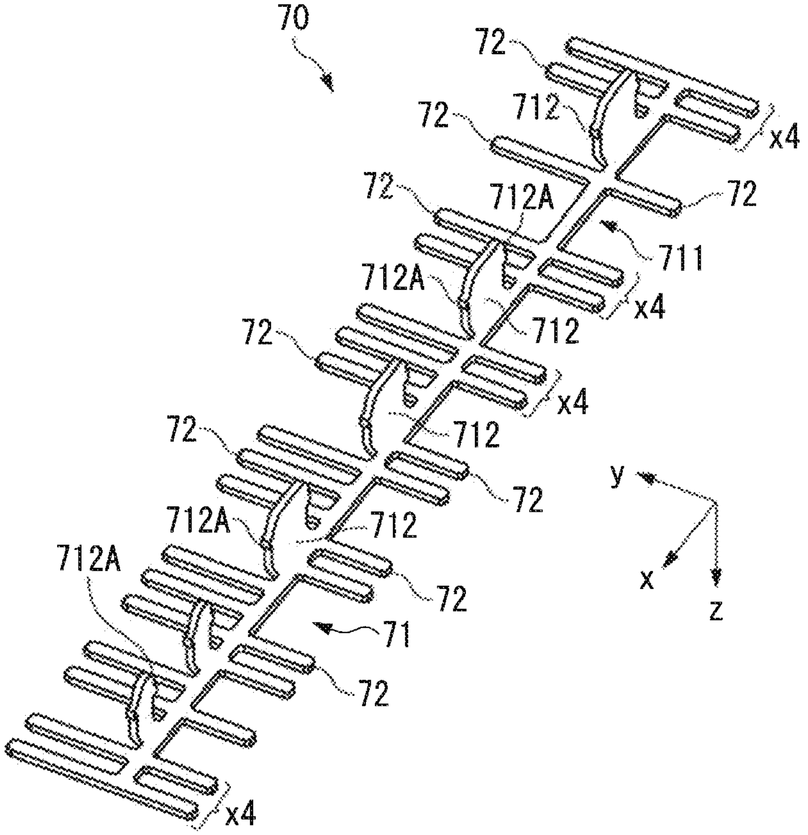
FIG. 4 is an isometric view of the ground contact connecting member.
Figure 10A:
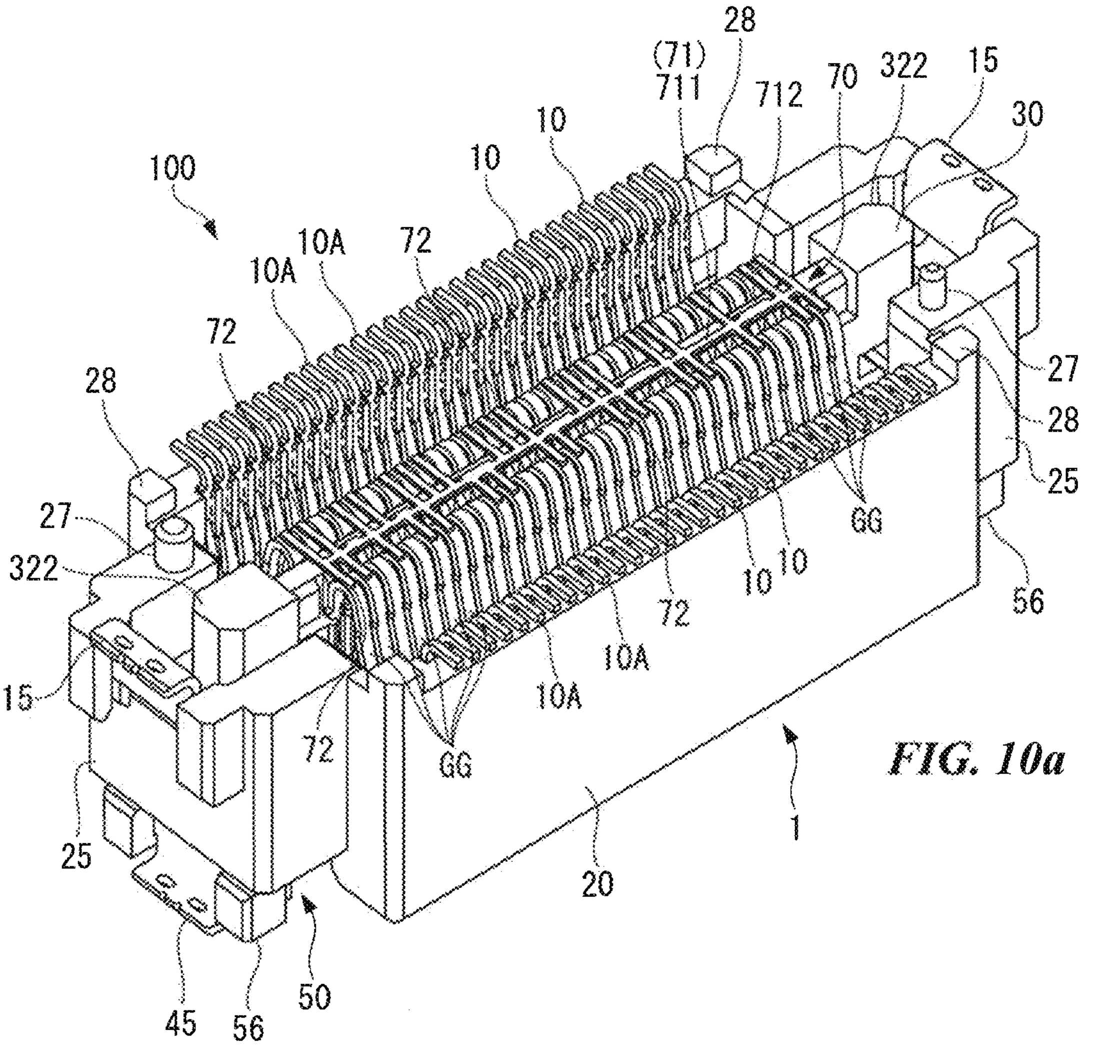
FIG. 10(*a*) is a bottom view shown from a direction of an arrow Xa of FIG. 1(*a*).
Figure 10B:
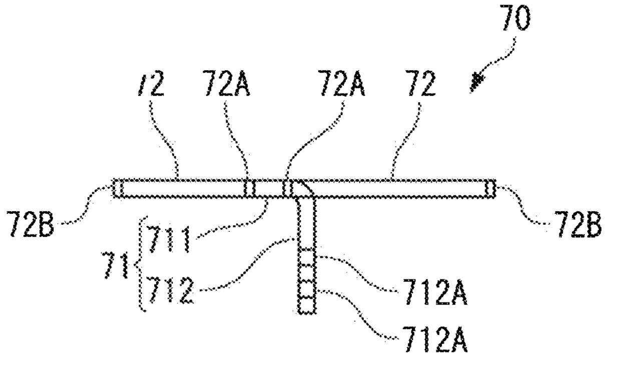

As shown in FIGS. 4, 10(*a*), and 11, the ground contact connecting member 70 contacts only a ground contact group GG composed of the plurality of first contacts 10 allocated to a ground use among all the first ground contacts 10. All the first contacts 10 in contact with the ground contact connecting member 70 become equipotential.

Figure 11:
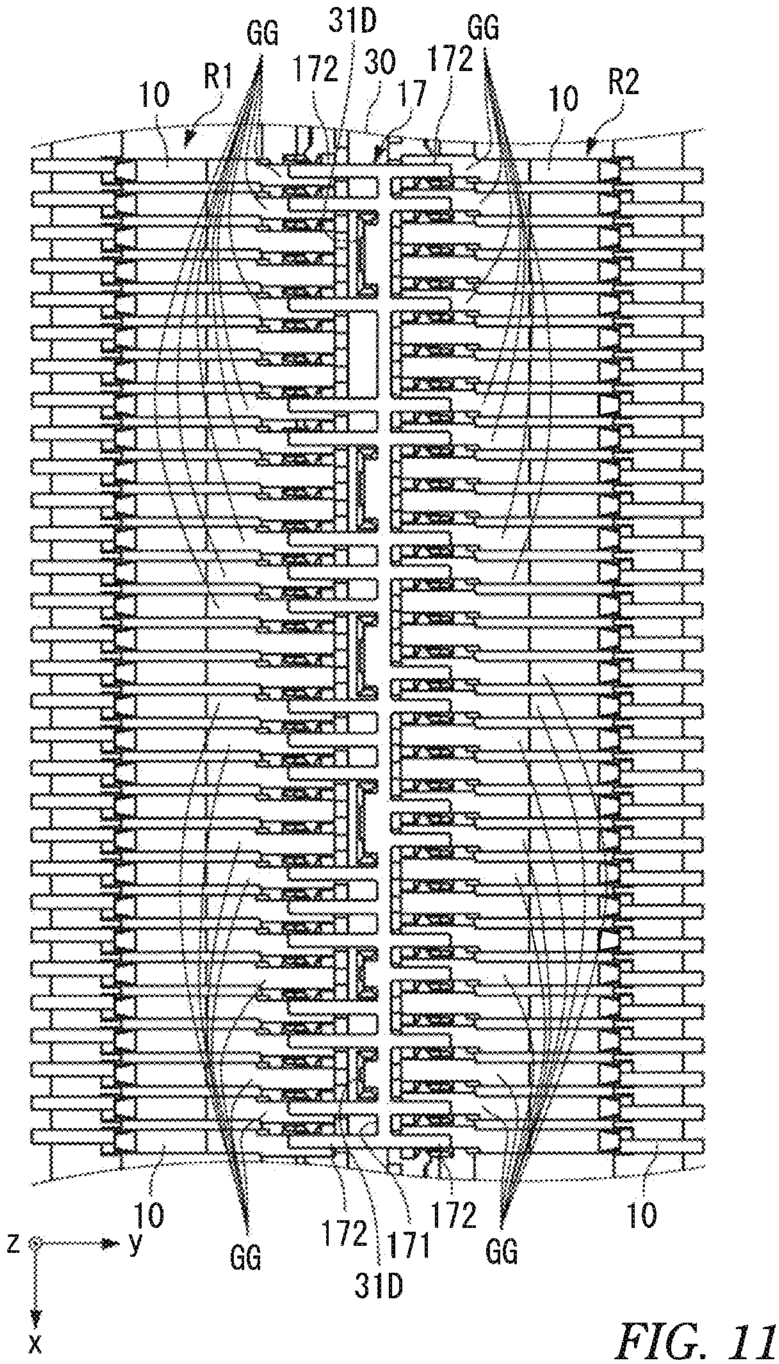
FIG. 11 is a bottom view of the ground contact connecting member and the first contact.

In FIG. 11, for convenience of illustration, the reference signs GG are separately shown at four locations. In FIG. 10(*a*), only some of the first contacts 10 of the ground contact group GG are denoted by GG. The ground contact group GG is equivalent to a group of the first contacts 10 corresponding to the ground potential of the whole ground contact connecting member 70, and the ground contact group GG is equivalent to some of the first contacts 10 of the first row R1 and some of the first contacts 10 of the second row R2.

The ground contact connecting member 70 includes a support portion 71 provided at the lower end 33 (an installation portion) of the movable housing 30 and extending in the first direction x, and a plurality of contacting beams 72 contacting the ground contact group GG from the first mounting face 61 side. Each contacting beam 72 extends from the support portion 71 toward the first row R1 or toward the second row R2. Each contacting beam 72 is arranged between the lower end 33 and the first mounting face 61A.

The support portion 71 includes a link portion 711 extending elongatedly in the first direction x along the lower end 33, and a retaining portion 712 provided at the link portion 711 and retained at the lower end 33. The link portion 711 links fixed ends 72A of the contacting beams 72 together in the first direction x and in the second direction y.

Press-fit protrusions 712A are formed on opposite sides in the first direction x of the retaining portion 712. The link portion 711 of the present embodiment is provided with a plurality of the retaining portions 712. These retaining portions 712 are press-fitted into the respective ground retaining grooves 31D of the movable housing 30.

The ground contact connecting member 70 can be formed by stamping and forming a sheet metal material such as a copper alloy. It is preferred that the retaining portion 712 be a bent piece bent perpendicularly on one widthwise (the second direction y) side of the link portion 711. The retaining portion 712 is press-fitted into the lower end 33 in the mating direction z. The retaining portion 712 can be formed anywhere in the first direction x other than where the contacting beams 72 are formed on widthwise opposite sides of the link portion 711 (for example, x4 of FIG. 4). The contacting beams 72 protrude perpendicularly from the link portion 711 in the second direction y toward the ground-use contacts 10 of the first row R1 or toward the ground-use contacts 10 of the second row R2. In the present embodiment, the length of the contacting beam 72 extending from the link portion 711 toward the first row R1 and the length of the contacting beam 72 extending from the link portion 711 toward the second row R2 are different, but they may be the same. The ground contact connecting member 70 of the present embodiment, as shown in FIG. 10(*b*), is formed with line symmetry in the second direction y with respect to the retaining portion 712. The width (a dimension in the first direction x) of the contacting beam 72 is narrower than the width (a dimension in the first direction x) of a portion contacting the contacting beam 72 of the first contact 10. The width of the contacting beam 72 may be equal to the joining portion 10A and/or the connecting portion 10E of the first contact 10.

The lower end 33 of the movable housing, at which the ground contact connecting member 70 is installed, is located above the lower end of the second curved portion C2 of the first contact 10. The second curved portion C2 of the first contact 10 is adjacent to the lower end 22. When the retaining portion 712 is press-fitted into the ground retaining groove 31D to a predetermined depth, each contacting beam 72 is deflected in its thickness direction and is pressed in the mating direction z against the second curved portion C2 of the ground-use first contact 10.

Since the second curved portion C2 of the first contact 10 is located in the vicinity of the movable retaining portion 10C retained by the movable housing 30, the second curved portion C2 is displaced following the movable housing 30. Therefore, even when the movable housing 30 is displaced relative to the stationary housing 20 and the housing 50 of the second connector 4 while the first curved portion C1 of the first contact 10 is being elastically deformed during mating of the first connector 1 and the second connector 4, a distance between the second curved portion C2 and the movable housing 30 remains almost unchanged. Therefore, the fact that the contact beam 72 is in contact with the second curved portion C2 has no effect on displacement behavior of the movable housing 30 relative to the stationary housing within the floating ranges.

The contacting beam 72 of the present embodiment, as shown in FIGS. 4 and 10(*b*), extends in the same plane as the link portion 711, and is formed in a flat shape. The contacting beam 72 is not limited to this and may have a step 721 in the thickness direction, like the contacting beam 72 included in ground contact connecting members 70-1, 70-2 shown in FIGS. 12(*b*) and 13(*b*). The step 721 causes the position of a free end 72B of the contact beam 72 to be spaced farther from the first mounting face 61A than the position of the fixed end 72A. The contacting beam 72 can be given an appropriate shape according to a relative distance between the lower end 33, the second curved portion C2, and the contacting beam 72, a contact pressure required between the contact beam 72 and the second curved portion C2, or the like.

As shown by way of example in FIGS. 12(*a*) and 13(*a*), the signal-use/ground-use allocation has various patterns according to products. The ground contact connecting member 70-1 shown in FIG. 12(*b*) corresponds to the allocation pattern shown in FIG. 12(*a*). The ground contact connecting member 70-2 shown in FIG. 13(*b*) corresponds to the allocation pattern shown in FIG. 13(*a*). The first connector 1 of the present embodiment includes means for making the ground-use first contacts 10 equipotential as the ground contact connecting member 70 separate from the first contacts 10. Therefore, the ground contact connecting member 70 can be adapted to various products by customizing the positions of the contacting beams 72 and the retaining portion 712 according to the signal-use/ground-use allocation pattern.

In order to adapt to the change of the position of the retaining portion 712 due to customization, it is preferred that a portion corresponding to the ground retaining groove 31D of a mold for molding the movable housing 30 be an insert so that the movable housing 30 having the ground retaining groove 31D in a different position can be produced. Using the ground contact connecting member 70 can improve SI (signal intensity) performance, for example, as shown in an analysis result of the frequency response of the insertion loss (IL) of FIG. 14.

A more specific configuration of the second connector 4 will be described with reference to FIGS. 15(*a*), 15(*b*), and 16. The second connector 4 includes the plurality of second contacts 40, the housing 50 retaining them, and joining members 45, and is mated with the movable housing 30. The second contacts 40 of the first row r1 and the second contacts 40 of the second row r2, like the first contacts 10, are arranged with a constant pitch P in the first direction x, and are adjacent to each other in the second direction y. The second contact 40 is formed by stamping a sheet material formed from a metal material such as a copper allow into a linear elongated shape, and further forming it. The second contact 40 includes a joining portion 40A joined to the second circuit board 62, a retaining portion 40B retained by the housing 50, and a connecting portion 40C electrically connected to the first contact 10.

The second contact 40 of the present embodiment has a section 401 extending perpendicularly to the joining portion 40A and is formed in an L-shape as a whole. The section 401 includes the retaining portion 40B and the connecting portion 40C. The retaining portion 40B includes press-fit protrusions 40B1 and a protrusion 40B2 and is formed in the vicinity of the joining portion 40A in the section 401. A region below the retaining portion 40B in the section 401 is equivalent to the connecting portion 40C. The connecting portion 10E of the first contact 10 of the first row R1 and the connecting portion 10E of the first contact 10 of the second row R2 are inserted into between the connecting portion 40C of the first row r1 and the connecting portion 40C of the second row r2, as shown in FIG. 1(*b*).

The housing 50 includes walls 51 to 54 enclosing the second contacts 40 of the first row r1 and of the second row r2 from four directions and arranged on the second mounting face 62A, two positioning bosses 57 (FIG. 1(*a*)) inserted into holes, not shown, of the second circuit board 62, and legs 58 arranged on the second mounting face 62A.

The side wall 51 and the side wall 52 extend in the first direction x with a length commensurate with the lengths of the rows r1, r2, and face each other in the second direction y. Grooves 511 in each of which the second contact 40 of the first row r1 is arranged are formed inside the side wall 51 along the mating direction z. The groove 511 includes a retaining groove 511A into which the second contact 40 is press-fitted. Grooves 521 in each of which the second contact 40 of the second row r2 is arranged and each of which includes a retaining groove 521A are also formed inside the side wall 52 along the mating direction z.

A guide slope 512 is formed on an inner side of a lower end of the side wall 51 in order to position the movable housing 30 of the first connector 1 and the housing 50 relative to each other in the second direction y. A similar guide slope 522 is also formed on an inner side of a lower end of the side wall 52. The guide slopes 512, 522 are symmetrically formed in the second direction y.

Figure 15A:
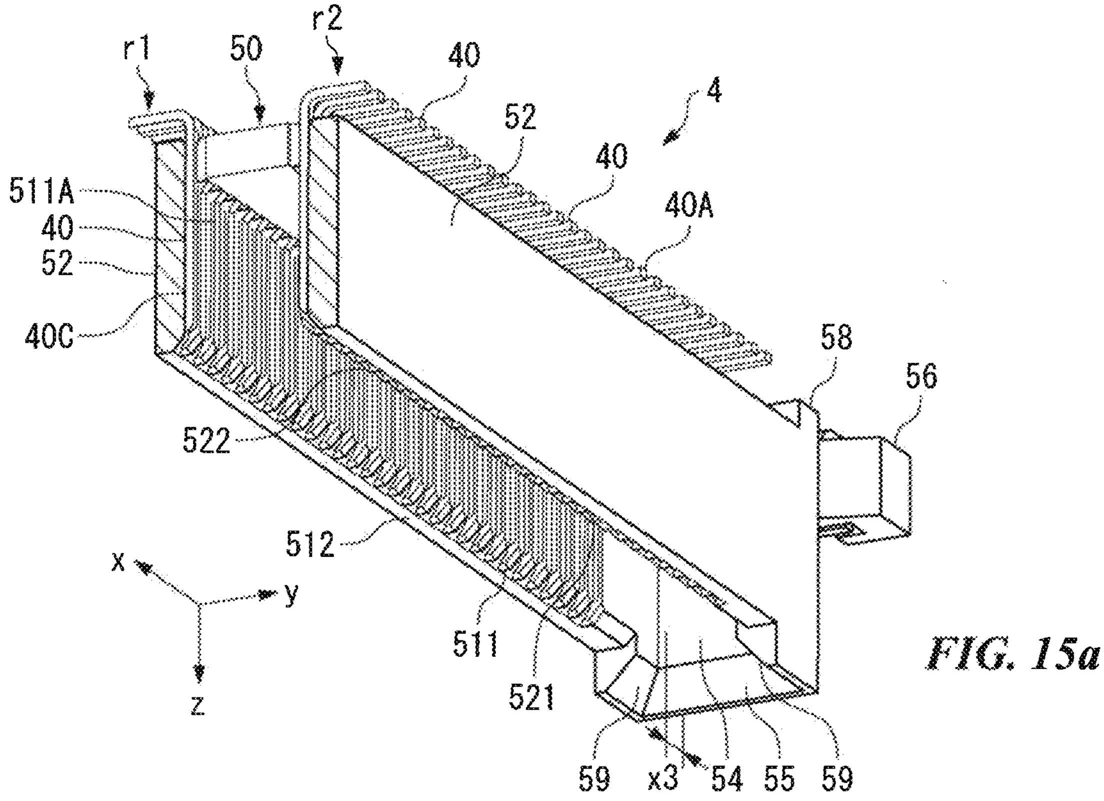
FIG. 15(*a*) is a partially cutaway isometric view of the second connector.
Figure 15B:
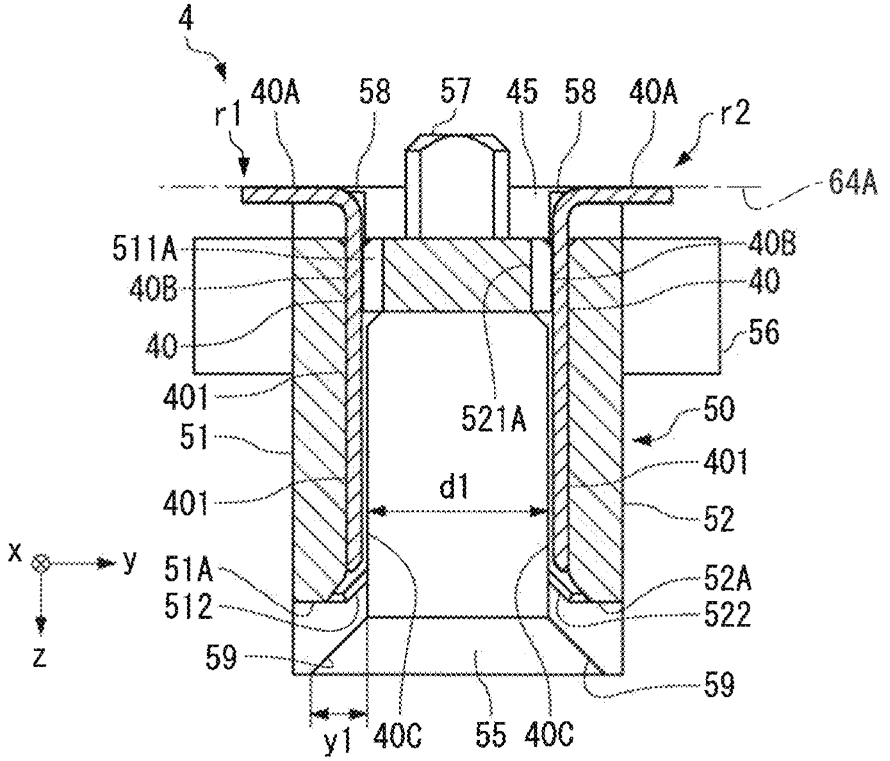

When the second contacts 40 are each inserted into the grooves 511, 512 of the housing 50 from the connecting portion 40C and is press-fitted into the retaining grooves 511A, 521A, leading ends of the connecting portions 40C are arranged adjacently to the guide slopes 512, 522, as shown in FIG. 15(*b*). The joining portions 40A are arranged outside the grooves 511, 521. The joining portion 40A are located slightly above the positions of the legs 58.

A distance d1 in the second direction y between the connecting portion 40C of the second contact 40 of the first row r1 and the connecting portion 40C of the second contact 40 of the second row r2 is smaller than a distance d2 (FIG. 2(*b*)) in the second direction y between a vertex of the connecting portion 10E of the first contact 10 of the first row R1 and a vertex of the connecting portion 10E of the first contact 10 of the second row R2. When the first connector 1 and the second connector 4 are mated, as shown in FIG. 1(*b*), the connecting portion 10E of the first contact 10 of the first row R1 contacts the connecting portion 40C of the second contact 40 at the vertex while being pressed between the second contact 40 of the first row r1 and the movable housing 30. The same applies to the connecting portion 10E of the first contact 10 of the second row R2. Since the connecting portion 40C of the second contact 40 is formed linearly in the mating direction z, even when the first contact 10 and the second contact 40 are misaligned in the mating direction z, the connecting portion 40C and the connecting portion 10E can be brought into stable contact with each other.

The walls 53, 54 are provided at opposite ends in the first direction x of the side walls 51, 52, and face each other in the first direction x. Heights of the walls 53, 54 from the second mounting face 62A are higher than heights of the side walls 51, 52 from the second mounting face 62A. First guide slopes 55 inclined relative to a y-z plane are formed on opposite ends in the first direction x of the walls 51 to 54. Second guide slopes 59 inclined relative to an x-z plane are formed at four corners of the walls 51 to 54. These guide slopes 55, 59 are arranged below the lower ends 51A, 52A of the side walls 51, 52. The first guide slopes 55 are symmetrically formed in the first direction x. The second guide slopes 59 are symmetrically formed in the second direction y.

The first guide slopes 55 contact the slopes 321A of the guide protrusions 321 of the movable housing 30 before the guide slopes 512, 522 of the side walls 51, 52 contact the guide slopes 31C of the movable housing 30, and follow the position of the housing 50 to guide the movable housing 30 in the first direction x. Simultaneously, the second guide slopes 59 contact the slopes 321B of the guide protrusions 321 of the movable housing 30 before the guide slopes 512, 522 of the side walls 51, 52 contact the guide slopes 31C of the movable housing 30, and follow the position of the housing 50 to guide the movable housing 30 in the second direction y.

The first guide slopes 55 are inclined relative to the y-z plane. The second guide slopes 59 are inclined relative to the x-z plane. A guide range x3 (FIG. 15(*a*)) equal to the slope 321A of the guide protrusion 321 of the movable housing 30 is set in the first guide slope 55A. It is preferred that the guide range x3 be larger than the dimension of the first gap G1. A guide range y1 (FIG. 15(*b*)) equal to the slope 321B of the guide protrusion 321 of the movable housing 30 is set in the second guide slope 59A. It is preferred that the guide range y1 be larger than the dimension of the second gap G2.

The joining member 45 includes a joining portion 451 joined to the second circuit board 62, and a press-fit portion having protrusions 452A on opposite sides. Joining member retaining portions 56 are provided on outer sides of the walls 53, 54. A retaining groove 56A into which the joining member 45 is inserted from below is formed in the joining member retaining portion 56.

A procedure for assembling the connector assembly 100 will be described below, and simultaneously main advantageous effects provided by the present embodiment will also be described.

First, an example of a procedure for assembling the first connector 1 will be described. The housing joining members 15 are press-fitted into respective ones of the pair of grooves 261 provided in the respective extended walls 25 on the opposite sides of the stationary housing 20 (FIG. 2(*a*)). In addition, the movable housing 30 is arranged inside the stationary housing 20 from below (FIGS. 2(*b*), 7). Thereafter, the plurality of first contacts 10 can be attached to the stationary housing 20 and to the movable housing 30 from below using a jig, not shown.

For example, while the stationary housing 20 and the movable housing 30 are being supported in position by a first jig, not shown, and the first contacts 10 are also being aligned in the first row R1 and in the second row R2 by a second jig, the first contacts 10 of the first row R1 and of the second row R2 are pushed upward by a third jig in contact with the pressing portions 10B3 and by the third jig in contact with the pressing portions 10C3. This causes the first contacts 10 of each of the rows R1, R2 to be inserted between the stationary housing 20 and the movable housing 30 from the first curved portion C1 and the connecting portion 10E. Then, as shown in FIG. 2(*b*), the stationary retaining portions 10B of the first contacts 10 of the first row R1 are press-fitted into the retaining grooves 211 of the stationary housing 20, and the movable retaining portions 10C of the first contact 10 of the first row R1 are also press-fitted into the retaining grooves 310A on the first row R1 side of the movable housing 30. Simultaneously, the stationary retaining portions 10B of the first contacts 10 of the second row R2 are press-fitted into the retaining grooves 221 of the stationary housing 20, and the movable retaining portions 10C of the first contacts 10 of the second row R2 are also press-fitted into the retaining grooves 310A on the second row R2 side of the movable housing 30.

When the stationary retaining portions 10B and the movable retaining portions 10C are press-fitted, the movable housing 30 is supported by the second curved portions C2 of the first contacts 10 of the first row R1 and the second curved portions C2 of the first contacts 10 of the second row R2. At this time, the lower end 33 of the movable housing 30 is located above the legs 28 of the stationary housing 30. The second curved portions C2 are located below the lower end 33 of the movable housing 30 and are located above the legs 28. The joining portions 10A of the first contacts 10 are located slightly below the legs 28 of the stationary housing 20.

After the first contacts 10 are attached, the ground contact connecting member 70 is attached to the movable housing 30 by press-fitting the retaining portion 712 into the ground retaining groove 31D. When the retaining portion 712 is press-fitted into the ground retaining groove 31D to a predetermined depth, each contacting beam 72 is deflected in the thickness direction and pressed in the mating direction z against the second curved portion C2 of the ground-use first contact 10. Therefore, even when the respective positions of the second curved portions C2 of the first contacts 10 vary in the mating direction z, the contacting beams 72 can be brought into stable contact with the contact group GG. In this manner, the SI performance can be stabilized through potential equalization of the ground-use contacts 10 by the member 70 including the contacting beams 72 brought into stable contact with the first contacts 10.

Assembling of the first connector 1 is thus completed (FIGS. 2(*a*), 2(*b*)). The movable housing 30 is supported with a positional degree of freedom within the floating ranges in the first direction x, in the second direction y, and in the direction of rotation in the x-y plane by elastic deformation of the first contacts 10 of the first row R1 and of the first contacts 10 of the second row R2.

When the first connector 1 is arranged and mounted on the first circuit board 61, as shown in FIG. 1(*b*), the two bosses 27 of the stationary housing 20 are inserted into the respective holes, no shown, of the first circuit board 61, and the legs 28 are brought into contact with the first mounting face 61A. In this state, the joining portion 10A of each first contact 10 is joined with solder to a terminal portion, not shown, formed on the first mounting face 61A, and the joining portions 151 of the housing joining members 15 are also joined with solder to the first mounting face 61A. Using the housing joining members 15 increases the strength of joining the first circuit board 61 and the first connector 1 together. When the stationary housing 20 is fixed to the first circuit board 61 by joining the first contacts 10 and the housing joining members 15, the lower portions 322 of the movable housing 30 are arranged between the facing portions 251 of the stationary housing 20 and the first circuit board 61, as shown in FIG. 7, so that the movable housing 30, the stationary housing 20, and the first circuit board 61 are assembled together.

Figure 16:
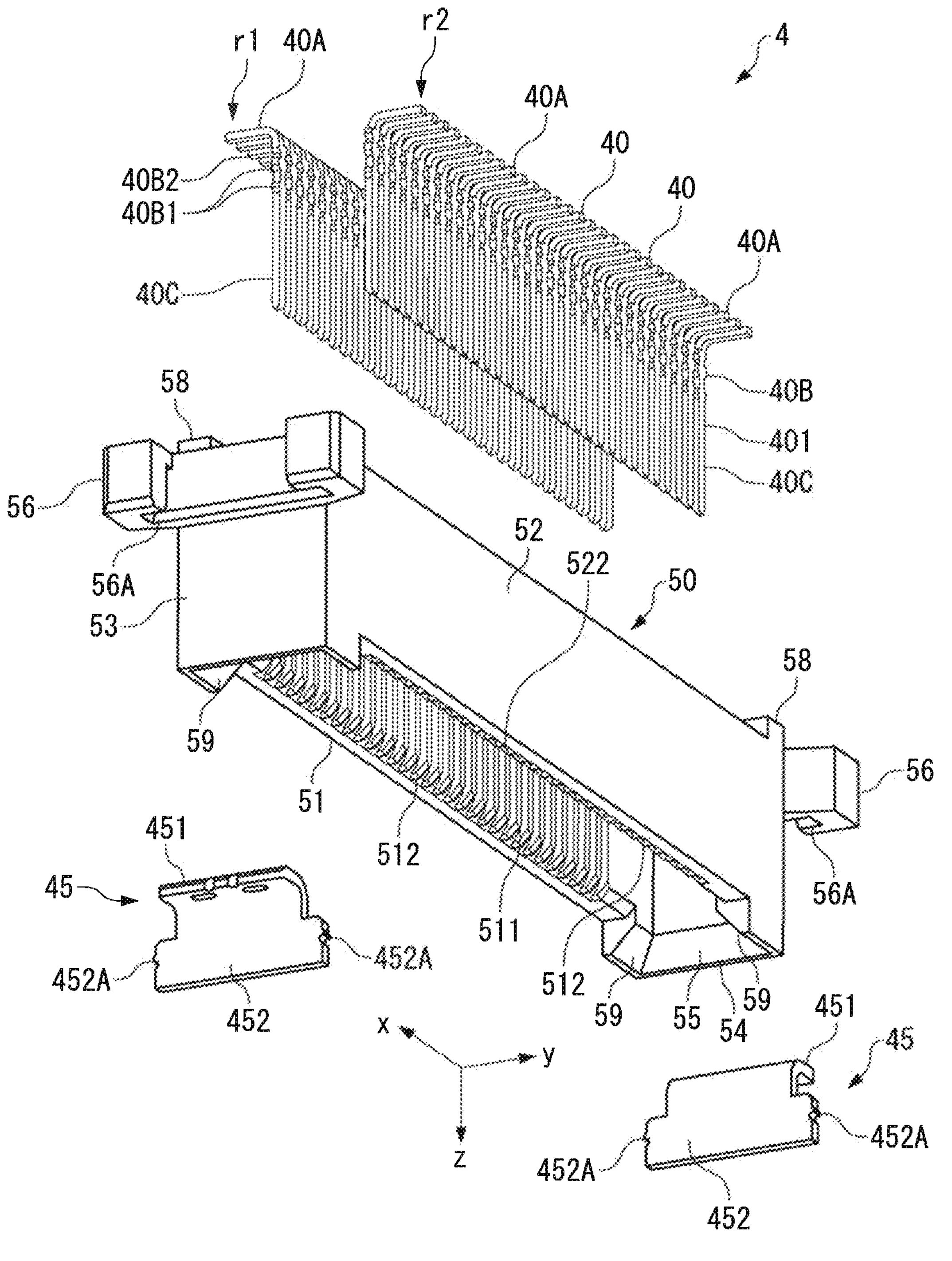
FIG. 16 is an exploded isometric view of the second connector.

On the other hand, when the second connector 4 (FIGS. 15 and 16) is assembled, for example, the second contacts 40 are inserted into the grooves 511, 521 from above while being arranged in the first row R1 and in the second row R2, respectively, using a jig, not shown, and the second contacts 40 are press-fitted into the retaining grooves 511A, 521A. In addition, the joining members 45 are press-fitted into the joining member retaining portions 56. In this manner, assembling of the second connector 4 is completed.

When the second connector 1 is arranged and mounted on the first circuit board 62, the bosses 57 of the housing 50 are inserted into the holes, not shown, of the second circuit board 62, and the legs 58 are brought into contact with the second mounting face 62A.

Figure 17:
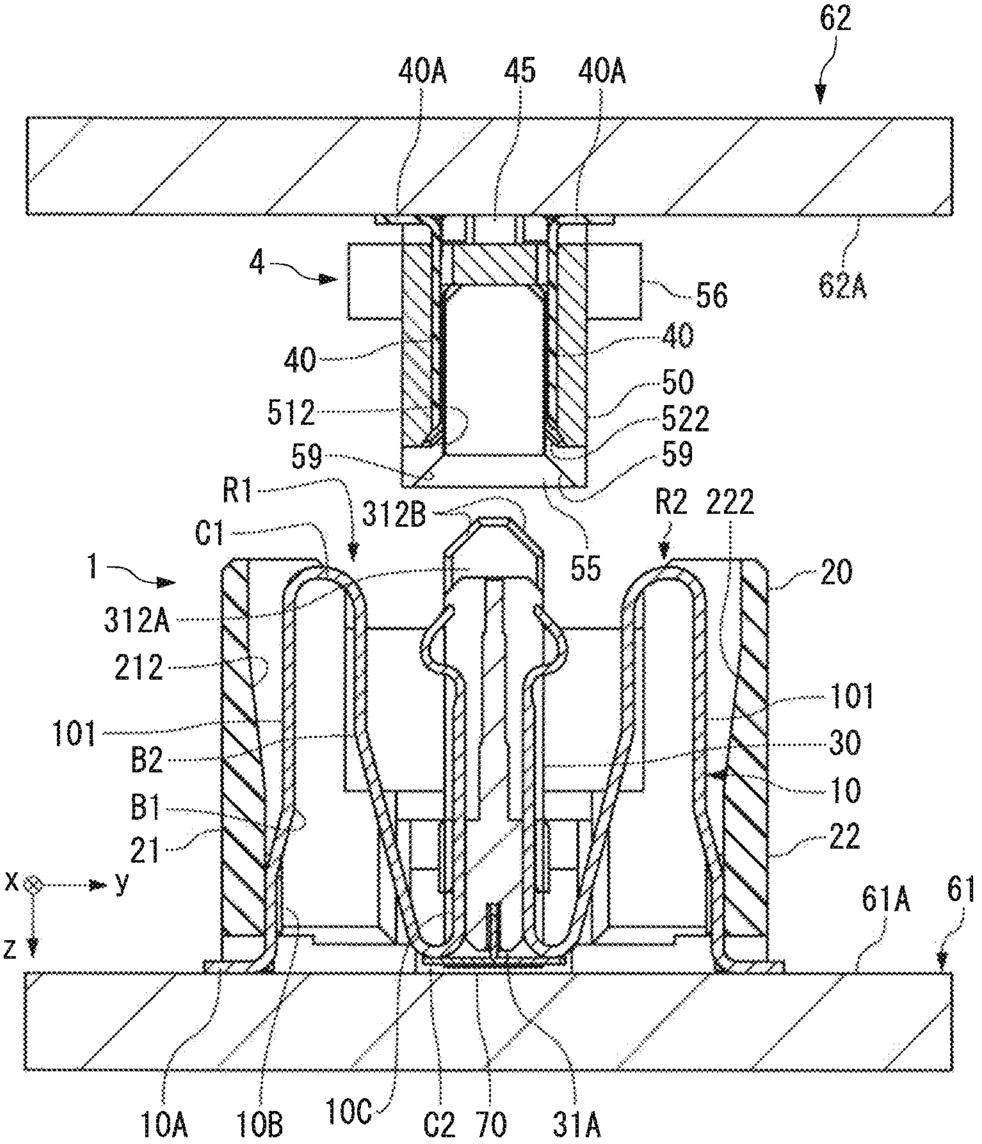
FIG. 17 is a cross sectional view showing the first connector and the second connector before mating.

In this state, the joining portion 40A of each second contact 40 is joined with solder to the second mounting face 62A, and the joining portions 451 of the joining members 45 are joined with solder to the second mounting face 62A. When a structure including the first circuit board 61 and the first connector 1 and a structure including the second circuit board 62 and the second connector 4 are assembled together, it is not always true that the respective positions of the first connector 1 and the second connector 2 in the second direction y are coincident with each other, as shown in FIG. 17, because of stacked tolerance such as dimensional and form, machining, and assembly tolerances of members.

However, even when the respective positions of the first connector 1 and the second connector 4 are misaligned in at least one of the first direction x and the second direction y, the first connector 1 and the second connector 4 can be mated to obtain the connector assembly 100, and the first circuit board 61 and the second circuit board 62 can also be assembled together, based on the configuration of the first connector 1.

When the movable housing 30, the stationary housing 20, and the first circuit board 61 are in an assembled state, the movable housing 30 is supported by the stationary housing 20 via the first contacts 10. In other words, the movable housing 30 is so supported as to be displaceable by elastic deformation of the first contacts 10 in the first direction x and in the second direction y. As for a direct relation between the movable housing 30 and the stationary housing 20 at this time, the lower portions 322 of the movable housing 30 and the facing portions 251 of the stationary housing 20 face each other in the mating direction z, and relative displacement in the first direction x and in the second direction y between the movable housing 30 including the lower portions 322 and the stationary housing 20 including the facing portions 251 is allowed within the floating ranges commensurate with the gaps G1, G2 set between the movable housing 30 and the stationary housing 20. Here, since the lower portions 322 are arranged between the facing portions 251 and the first circuit board 61, and the movable housing 30 and the stationary housing 20 are thus assembled together, the movable housing 30 and the stationary housing 20 are not restrained by a metal fitting for assembly or the like. Since the relative displacement between the movable housing 30 and the stationary housing 20 is not prevented by such a metal fitting, the floating ranges can be sufficiently secured across the entire gaps G1, G2. Therefore, according to the present embodiment, the first connector 1 and the connector assembly 100 which can increase the floating ranges, for example, to a scale of ±1 mm or more can be provided.

Figure 18:
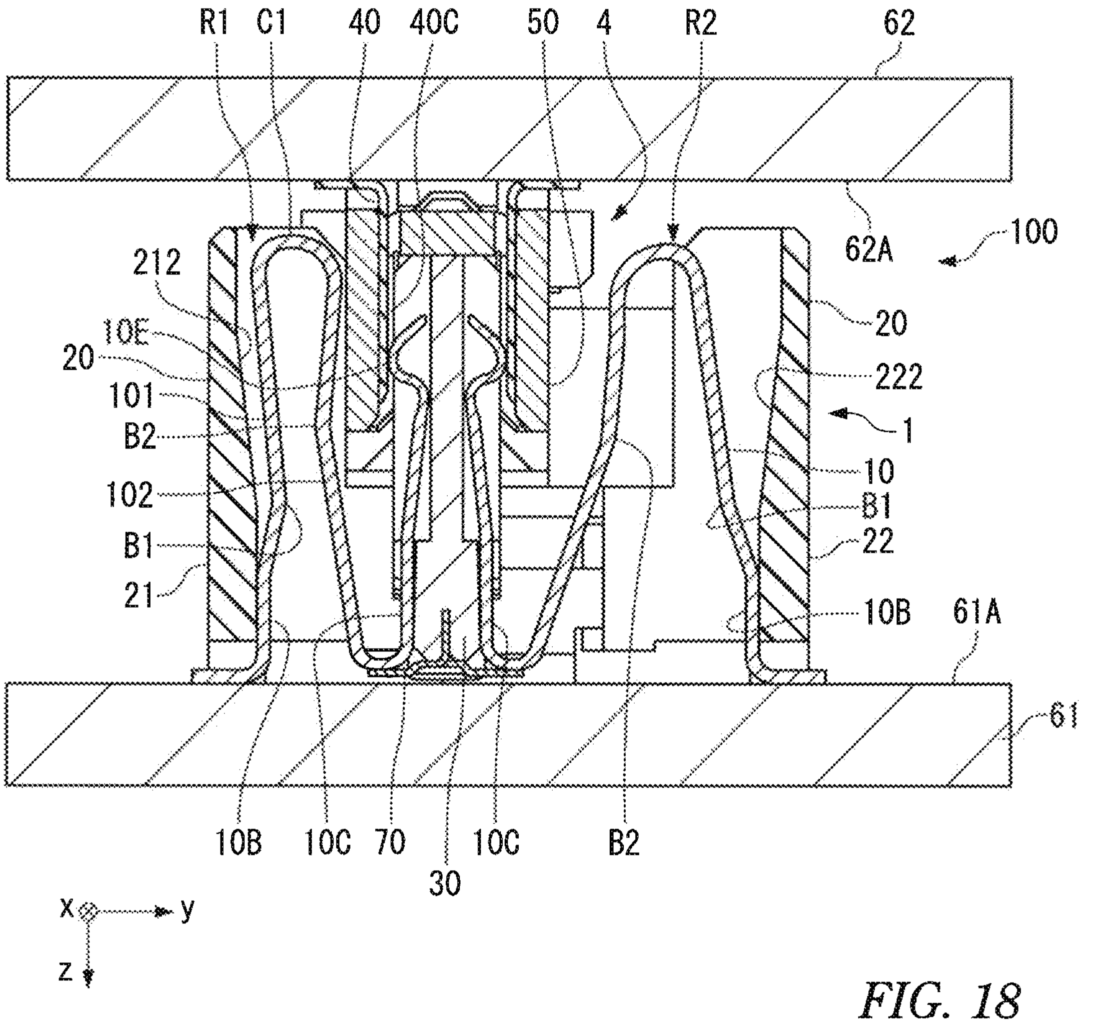
FIG. 18 is a cross sectional view showing the contacts elastically deformed when the first connector and the second connector are mated.

For example, when the first connector 1 and the second connector 4 are mated with a misalignment in the second direction y, the movable housing 30 follows the position of the housing 50 and is displaced in the second direction y relative to the stationary housing 20 while elastically deforming the first contacts 10 in the second direction y, as shown in FIG. 18. Since the ground contact connecting member 70 in contact with the first contacts 10 has no effect on behavior of the movable housing 30, as described above, the installation of the ground contact connecting member 70 does not change the floating ranges.

The first connector 1 and the second connector 4 are allowed to have a misalignment amount commensurate with the predetermined floating ranges in the first direction x, the second direction y, and the direction of x-y rotation based on the first gap G1 and the second gap G2. When the first connector 1 and the second connector 2 are mated, the movable housing 30 is guided in the second direction y by an interaction between the slopes 321B of the guide protrusions 321 and the second guide slopes 59 of the housing 50 to determine an approximate position in the second direction y, and is thereafter positioned in the second direction y relative to the housing 50 by an interaction between the guide slopes 31C and the guide slopes 512, 522. Therefore, the movable housing 30 and the housing 50 can be smoothly mated.

Figure 19:
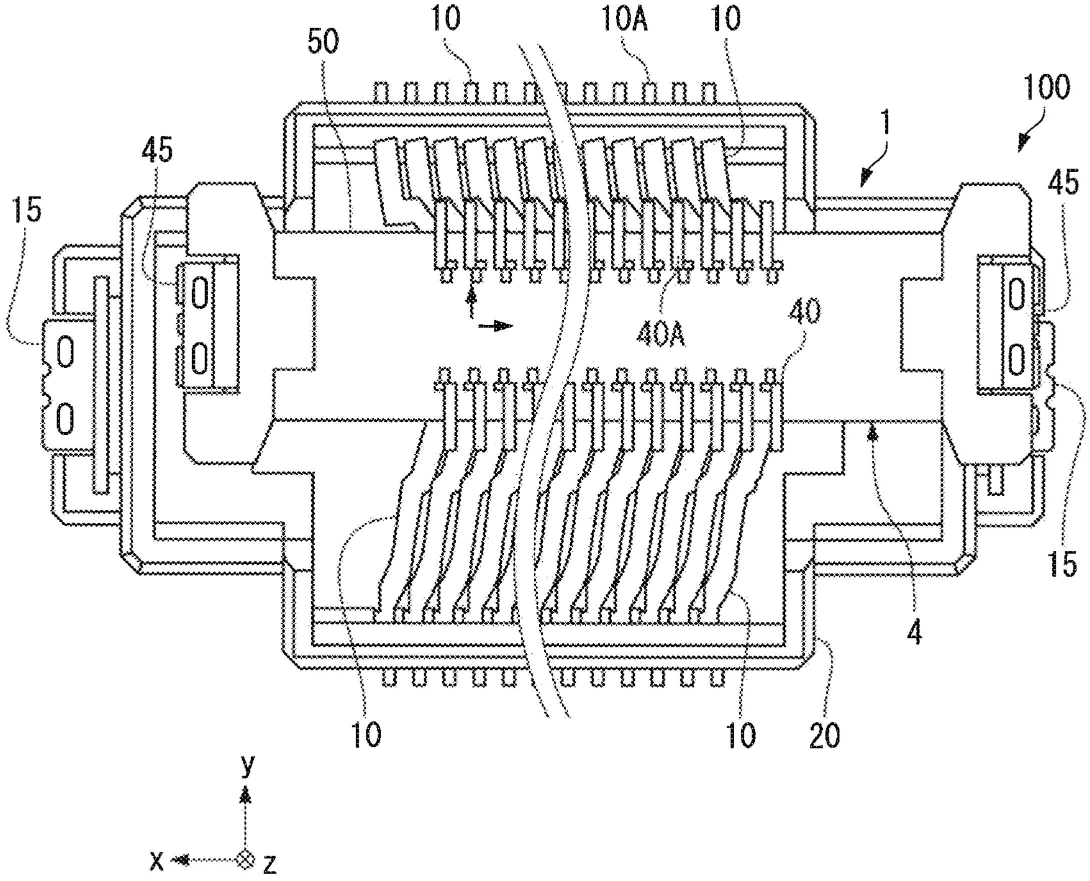
FIG. 19 is a top view showing the contacts elastically deformed in the first direction and in the second direction when the first connector and the second connector are mated.

In addition, FIG. 19 shows the first connector 1 and the second connector 4 misaligned in both the first direction x and the second direction y. Also in this case, within the floating ranges, the movable housing 30 is displaced relative to the stationary housing 20 and the housing 50 by an interaction between the slopes 321A, 321B of the guide protrusions 321 and the guide slopes 55, 59 and a subsequent interaction between the guide slopes 31C and the guide slopes 512, 522. With this, each first contact 10 is elastically deformed in the first direction x and in the second direction y.

In addition to the above, a selection may be made from the configurations mentioned in the above embodiment, or an appropriate change into another configuration may be made, without departing from the spirit of the present invention. A joining object to which the first contact 10 is joined is not necessarily limited to a circuit board. Likewise, an object to which the second contact 40 is joined is not necessarily limited to a circuit board. The facing portion 251 formed on the stationary housing 20, and a portion of the movable housing 30 arranged between the facing portion 251 and a reference plane to be joined (the first mounting face 61A) are not limited to the above embodiment and may be appropriately configured. In addition, the first gap G1 is not limited to being set between the facing portion 251 and the recess 323, as in the above embodiment, and may be set between the movable housing 30 and the stationary housing 20 in a position at a distance from the facing portion 251 and the recess 323. Likewise, the second gaps G2 are not limited to being set between the side walls 322A, 322B of the extended region 32 and the side walls 252A, 252B of the extended wall 25, as in the above embodiment, and may be set between the movable housing 30 and the stationary housing 20 in a position at a distance from the extended region 32 and the extended wall 25.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A ground contact connecting member contacting a ground contact group, the ground contact group including, among a plurality of contacts arranged along a predetermined first direction in a first row and in a second row in parallel with the first row, a portion of the contacts of the first row and a portion of the contacts of the second row adjacent to the first row in a second direction, comprising:

a support portion extending in the first direction and arranged at an installation portion of a connector housing retaining the plurality of contacts; and a plurality of contacting beams extending from the support portion toward the first row or toward the second row and contacting the ground contact group, the contacting beams are pressed against the contacts of the ground contact group in a third direction perpendicular to both the first direction and the second direction.

2. The ground contact connecting member according to claim 1, wherein the support portion includes a link portion connecting fixed ends of the contacting beams in the first direction and in the second direction.

3. The ground contact connecting member according to claim 2, wherein the support portion further includes at least one press-fit portion provided at the link portion and press-fitted into the installation portion in the third direction.

4. The ground contact connecting member according to claim 3, wherein the press-fit portion is a tab bent on one side in the second direction of the link portion.

5. The ground contact connecting member according to claim 1, wherein ground contacts comprising the ground contact group each include a movable retaining portion retained by the connector housing.

6. The ground contact connecting member according to claim 5, wherein each group contact further includes a stationary retaining portion retained by a stationary housing separate from the connector housing.

7. The ground contact connecting member according to claim 6, wherein a first curved portion and a second curved portion are formed between the stationary retaining portion and the movable retaining portion.

8. The ground contact connecting member according to claim 7, wherein the contacting beam contacts the second curved portion of the contact constituting the ground contact group in a vicinity of the movable retaining portion.

9. A connector assembly, comprising:

a first connector, including:

a plurality of contacts arranged in a plurality of rows;

a connector housing; and a stationary housing retaining the plurality of contacts with the connector housing and supporting the connector housing via the plurality of contacts; and a ground contact connecting member, including:

a support portion extending in a first direction arranged at an installation portion of the connector housing retaining the plurality of contacts; and a plurality of contacting beams extending from the support portion in a second direction and pressing against at least a portion of the plurality of contacts of a ground contact group in a third direction perpendicular to both the first direction and the second direction.

10. The connector assembly according to claim 9, wherein the plurality of contacts are arranged on a reference plane including the first direction and the second direction.

11. The connector assembly according to claim 10, wherein each of the plurality of contact contacting beams is arranged between the installation portion facing the reference plane and the reference plane.

12. The connector assembly according to claim 11, wherein each of the contacting beams contacts a portion adjacent to the installation portion of a respective one of the plurality of contacts from a side of the reference plane.

13. The connector assembly according to claim 9, further comprising a second connector mated with the connector housing of the first connector.

14. The connector assembly according to claim 9, wherein the plurality of contacts each include a movable retaining portion retained by the connector housing.

15. The connector assembly according to claim 14, wherein each contact further includes a stationary retaining portion retained by a stationary housing separate from the connector housing.

16. The connector assembly according to claim 15, wherein a first curved portion and a second curved portion are formed between the stationary retaining portion and the movable retaining portion.

17. A ground contact connecting member, comprising:

a support portion extending in a first direction and adapted to be fixed to an installation portion of a connector housing;

a plurality of contacting beams extending from the support portion in a second direction, perpendicular to the first direction, the contacting beams adapted to contact a plurality of ground contacts arranged in the connector housing in a third direction perpendicular to the first direction and the second direction; and at least one press-fit portion discrete from the plurality of contact beams and adapted to be press-fitted into the installation portion in the first direction.

18. The ground contact connecting member according to claim 17, wherein the support portion includes a link portion connecting fixed ends of the contacting beams in the first direction and in the second direction.

19. The ground contact connecting member according to claim 18, wherein the at least one press-fit portion is provided at the link portion.

20. The ground contact connecting member according to claim 19, wherein the press-fit portion is a tab bent on one side in the second direction of the link portion.

* * * * *